(12) United States Patent
Herlihy et al.

(10) Patent No.: US 12,380,039 B2
(45) Date of Patent: Aug. 5, 2025

(54) PLUG-AND-PLAY HUB FOR UNMANNED AERIAL VEHICLE

(71) Applicant: Performance Drone Works LLC, Huntsville, AL (US)

(72) Inventors: Philip Herlihy, Mahopac, NY (US); Adam Daigler Wetzel, Huntsville, AL (US); Dylan Thomas Hamm, Boise, ID (US)

(73) Assignee: Performance Drone Works LLC, Huntsville, AL (US)

( * ) Notice: Subject to any disclaimer, the term of this patent is extended or adjusted under 35 U.S.C. 154(b) by 0 days.

(21) Appl. No.: 18/677,636

(22) Filed: May 29, 2024

(65) Prior Publication Data

US 2024/0411707 A1    Dec. 12, 2024

Related U.S. Application Data

(60) Provisional application No. 63/506,578, filed on Jun. 6, 2023.

(51) Int. Cl.
| | |
|---|---|
| *G06F 13/10* | (2006.01) |
| *G06F 1/26* | (2006.01) |
| *B64U 10/14* | (2023.01) |
| *B64U 101/20* | (2023.01) |

(52) U.S. Cl.
CPC ............ *G06F 13/102* (2013.01); *G06F 1/266* (2013.01); *B64U 10/14* (2023.01); *B64U 2101/20* (2023.01); *B64U 2201/20* (2023.01)

(58) Field of Classification Search
None
See application file for complete search history.

(56) References Cited

U.S. PATENT DOCUMENTS

2020/0207474 A1*  7/2020  Foggia ................. G05D 1/0676

* cited by examiner

*Primary Examiner* — Scott C Sun
(74) *Attorney, Agent, or Firm* — Pearl Cohen Zedek Latzer Baratz LLP

(57) ABSTRACT

A plug-and-play Hub that provides an intermediary between an Unmanned Aerial Vehicle (UAV) and peripheral electronic devices. The Hub has a power and data interface to the UAV and peripheral ports that allow the peripheral electronic devices to connect to the Hub. The peripheral ports provide power to the peripheral electronic devices and also allow data communication between the Hub and the peripheral electronic devices. The Hub may detect when a peripheral electronic device has been plugged into a peripheral port and access communication protocol information and voltage level information by way of the peripheral port. A Hub voltage converter receives power from the UAV and converts the UAV power source voltage to a voltage level that is suitable for the various peripheral electronic devices. The Hub has a data hub that mediates data communication between the UAV and the various peripheral electronic devices.

20 Claims, 13 Drawing Sheets

PLUG-AND-PLAY HUB FOR UNMANNED AERIAL VEHICLE

CROSS-REFERENCE TO RELATED APPLICATION

The present application claims the benefit of U.S. Provisional Patent Application No. 63/506,578, filed on Jun. 6, 2023, which is hereby incorporated by reference in its entirety.

BACKGROUND

Radio controlled unmanned aerial vehicles or UAVs (e.g., drones, such as quadcopters) can move at high speed and make rapid changes in direction when remotely piloted by a skilled user. A drone may include a flight controller that provides output to motors and thus controls propeller speed to change thrust (e.g., in response to commands received from a user via a communication channel such as a Radio Frequency (RF) communication channel established between a user's remote-control and a drone). For example, a quadcopter has four motors, each coupled to a corresponding propeller above the motor, with propellers mounted to generate thrust substantially in parallel (e.g., their axes of rotation may be substantially parallel). The flight controller may change the speeds of the motors to change the orientation and velocity of the drone and the propellers may remain in a fixed orientation with respect to the chassis of the quadcopter (i.e. without changing the angle of thrust with respect to the quadcopter) and may have fixed-pitch (i.e. propeller pitch may not be adjustable like a helicopter propeller so that each motor powers a corresponding fixed-pitch propeller in a fixed orientation with respect to a drone chassis).

A UAV may have one or more peripheral electronic devices attached thereto. The peripheral electronic device could be carried as a payload attached to the UAV. Examples of peripheral electronic devices include, but are not limited to, IR (Infrared) cameras, EO (Electro-Optical) cameras, rangefinders, etc. The peripheral electronic devices may get their power from the UAV. Also, the peripheral electronic devices may need to communicate with the flight controller or other software in the UAV.

The various peripheral electronic devices may have different power requirements. For example, there could be a significant difference between the magnitudes of the voltage that power the different peripheral electronic devices. Moreover, the various peripheral electronic devices could use different communication protocols. Furthermore, the various peripheral electronic devices could have different form factors for the physical connectors used to provide the operating voltages and physical pathways for data communication.

DETAILED DESCRIPTION

Figure 1:
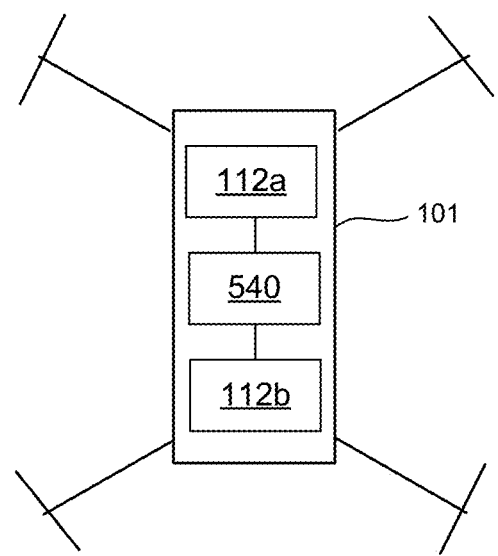
FIG. 1 is an embodiment of a UAV and remote control.
Figure 1:
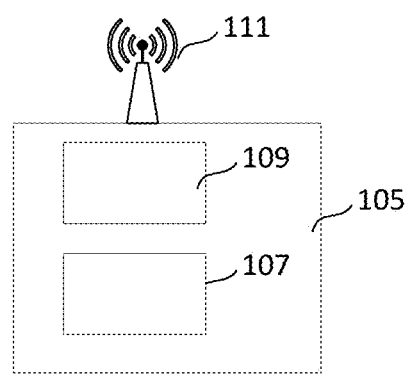

The following presents systems and methods associated with a Hub that provides an intermediary between a UAV and peripheral electronic devices. An embodiment of the Hub provides plug-and-play capability to allow a wide variety of peripheral electronic devices to easily connect the UAV. The Hub has a power interface to the UAV to receive power from the UAV. The Hub has a data interface to the UAV to communicate data between the Hub and the UAV. The Hub has a number of peripheral ports that allow the peripheral electronic devices to connect to the Hub. The peripheral ports provide power to the peripheral electronic devices and also allow data communication between the Hub and the peripheral electronic devices. An embodiment of the Hub has a control circuit that detects when a peripheral electronic device has been plugged into a peripheral port. The control circuit accesses communication protocol information and voltage level information by way of the peripheral port. The communication protocol information specifies a communication protocol used by the peripheral device connected to the peripheral port. The voltage level information species an operational voltage level needed by the peripheral device. In one embodiment, the control circuit reads the communication protocol information and the voltage level information from non-volatile memory in a cable that attaches the peripheral device to the peripheral port of the Hub. The Hub has a voltage converter connected to the UAV interface to receive power from the UAV. The power may be provided from the UAV as a voltage having a magnitude such as 24V. The voltage converter is able to convert the UAV power source voltage to a voltage level that is suitable for the various peripheral electronic devices. For example, the voltage converter might reduce a 24V voltage from the UAV to a 5V voltage to meet the voltage needs of a peripheral electronic device. The voltage converter will thus provide a suitable voltage to each respective peripheral electronic device based on the needs of the respective peripheral electronic device. An embodiment of the Hub has a data hub that is configured to mediate data transfer between the UAV and the various peripheral electronic devices. The Hub could reside on a Printed Circuit Board Assembly (PCBA). In one embodiment, the Hub attaches to the UAV. In one embodiment, the Hub resides in a Mechanical Release Device (MRD) that is attached to the UAV.

The optional Mechanical Release Device (MRD) allows the UAV to easily be adapted to carry a payload that can be dropped in response to a command (e.g., from a remote control device). A Mechanical Release Device (MRD) may be connected to the UAV (e.g., using a quick-release mechanism) and may include one or more payload latch mechanisms to hold one or more drop-payloads. A payload latch mechanism may include arms that operate in tandem to engage/disengage lugs of a drop-payload. Arms may be driven by a circular gear, which is linked to a latch actuator (e.g., a servo motor). The MRD may include an electronic system including control circuits to control the latch actuator and communicate with a UAV (and remote control device). The MRD may also include sensors (e.g., cameras and/or a rangefinder).

Aspects of the present technology may be implemented using a wide range of UAVs including, but not limited to drones (e.g., quadcopter drones). Such drones may be controlled by a user using a remote control device and/or may be controlled with little or no human input (e.g., using an autopilot to fly a predetermined flightpath and/or using Artificial Intelligence (AI) or other technology for autonomous flight).

Although the following description is primarily given the context of drones (e.g. quadcopters) moving along a three-dimensional flightpath, certain concepts presented can be applied more generally. For example, the systems and techniques can be applied to non-drone aircraft.

FIG. 1 shows an example of a UAV 101, which is controlled by remote control 105 in this example. Remote control 105 includes a user input interface 107 (e.g., one or more joysticks, buttons, touchpads, touchscreens, keyboards, or other input device(s) configured to receive a user's input). User input interface 107 allows a user to provide appropriate input to control UAV 101 (e.g., by using joysticks to control direction and speed of UAV). Remote control 105 also includes a user output interface 109 (e.g., one or more visual displays, lights, indicators, speakers, or other output devices configured to provide output to a user). For example, a display may show one or more views from camera(s) located on UAV 101 (e.g., a camera providing a pilot's view from UAV 101 to allow FPV operation of UAV 101). The remote control 105 is connected to transceiver 111 to allow two-way communication between remote control 105 and UAV 101. In some examples, a UAV may be configured for autonomous operation so that some or all piloting is performed autonomously (e.g., without input from a remote control such as remote control 105). For example, UAV 101 may include a Global Positioning System (GPS) module to determine position or enable independent navigation and/or one or more cameras (e.g., cameras that are paired to form stereoscopic cameras) that may allow UAV 101 to locate features in its environment for navigation.

The UAV 101 may have connected to it one or more peripheral electronic devices 112a, 112b. Examples of peripheral electronic devices 112 include, but are not limited to, IR (Infrared) cameras, EO (Electro-Optical) cameras, rangefinders, etc. The peripheral electronic devices 112 may get their power from the UAV 101. Also, the peripheral electronic devices 112 may need to communicate with the UAV 101. In an embodiment, the Hub 540 serves as an intermediary (e.g., communication mediator) between the peripheral electronic devices 112 and the UAV 101. For example, the Hub 540 may contain a data hub that facilitates communication between an endpoint in the UAV 101 and endpoints in the peripheral electronic devices 112. The Hub 540 may also receive power from the UAV 101 and provide power at a suitable voltage level to the peripheral electronic devices 112a, 112b.

One option is for the user to input configuration information into the user input interface 107 to configure a newly added peripheral electronic devices 112. For example, a user might specify the voltage level needed by a peripheral electronic device. Also, the user might specify a communication protocol used by the peripheral electronic device. However, an embodiment of the Hub 540 eliminates, or at least reduces, the need for the user to provide any information in the user input interface 107 to configure a newly added peripheral electronic devices 112. An embodiment of the Hub 540 provides for plug-and-play of the peripheral electronic devices 112a, 112b. In one embodiment, the Hub 540 automatically learns the voltage level and communication protocol requirements of the peripheral electronic devices 112a, 112b in response to the respective peripheral electronic devices 112a, 112b being plugged into the Hub 540. This can eliminate, or at least reduce, the need for the user to provide any information in the user input interface 107 to configure a newly added peripheral electronic device 112.

Figure 2:
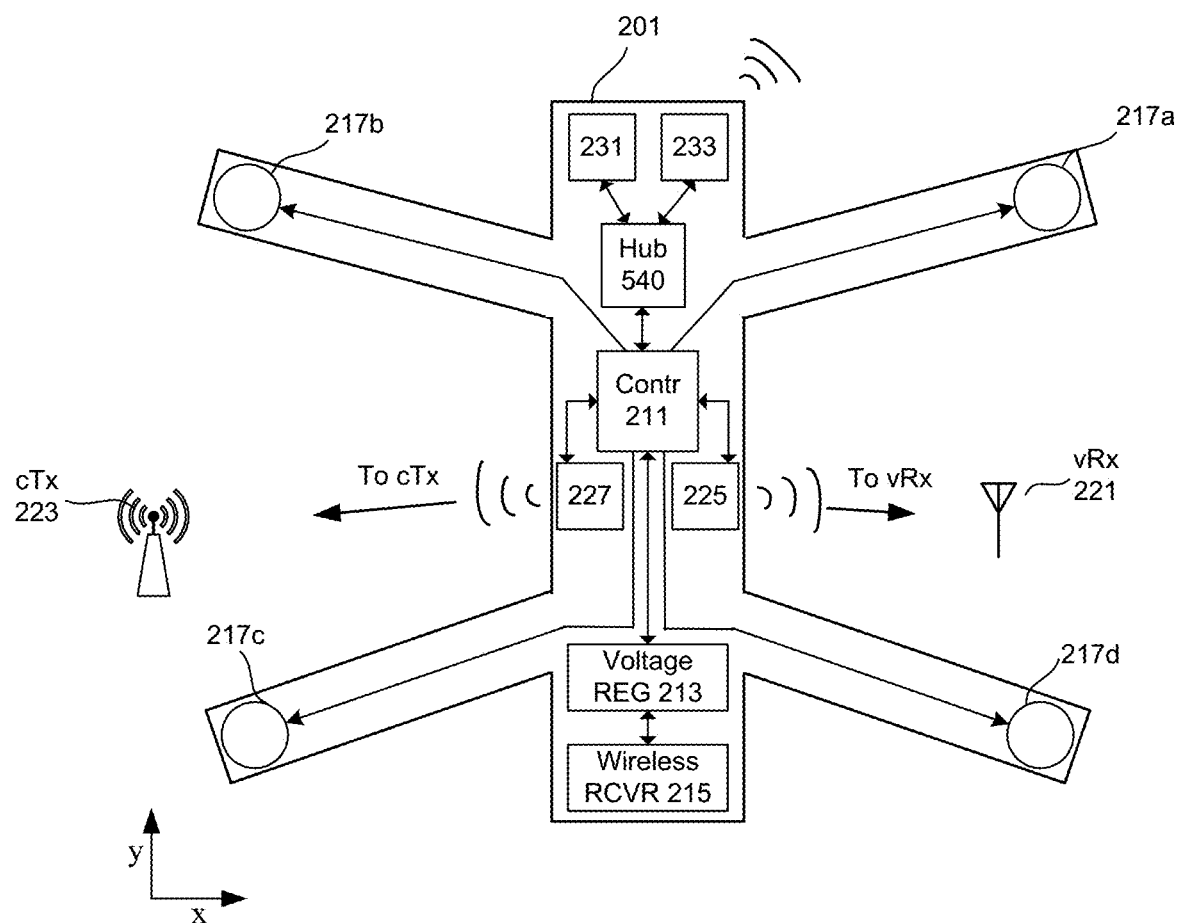
FIG. 2 is a simplified representation of some of the components for one embodiment of a UAV (quadcopter).

FIG. 2 is simplified representation of some of the components for one example of a UAV 201 (e.g., UAV 101), which is a remote-controlled quadcopter in this example. FIG. 2 shows flight controller 211 connected to motors 217a-d (which turn respective propellers, not shown in this view), the voltage source and regulator 213, wireless receiver 215, video camera 231 and altitude sensor 233, and the transmitters 225 and 227. In this embodiment, extending on an arm from each of the corners of UAV 201 is a motor 217a-d, each of which is controlled by the flight controller 211 to thereby control thrust generated by propellers attached to motors 217a-d. A voltage source (e.g., battery) and regulator 213 supplies power. A pilot's commands are transmitted from control signal transceivers such as cTx 223, received by wireless receiver 215. Control signal transceiver cTx 223 may be in a remote-control operated by a pilot (remote-control user) to fly UAV 201. The flight controller 211 uses power from the voltage source and regulator 213 to drive the motors 217a-d according to the pilot's signals.

UAV 201 also includes video camera 231 and altitude sensor 233 that supply data to the flight controller 211. The Hub 540 serves as an intermediary between the flight controller 211 and the video camera 231 and altitude sensor 233. The Hub may serve as a Data Hub with the flight controller 211 being one endpoint and the video camera 231 and altitude sensor 233 being other endpoints (that communicate with flight controller 211). The Hub 540 may also receive power from Voltage REG 213. For example, Voltage REG 213 might provide the Hub 540 with 24V. The Hub 540 may convert that voltage to a level that is needed by the peripheral electronic devices (e.g., video camera 231 and altitude sensor 233). In one embodiment, the Hub 540 allows plug-and-play capability for the video camera 231, altitude sensor 233, as well as other peripheral electronic devices.

An FM or other type video transmitter 225 transmits data from the video camera 231 to a video monitor receiver vRx 221 (external to the drone, such as on the ground) that monitors the video signals and passes on the video data to the pilot. Data can also be sent back to the control signal transceiver cTx 223 by the transmitter 227. Although the transmitter 227 and wireless receiver 215 are shown as separate elements in FIG. 2, in many embodiments these will be part of a single transceiver module. And control signal transceiver cTx 223 and video monitor receiver vRx 221 may be part of a single transceiver module. For example, a remote-control, such as remote control 105, may include both a control signal transceiver and a video monitor receiver to allow a remote-control user to see video from video camera 231 while piloting UAV 201.

Figure 3:
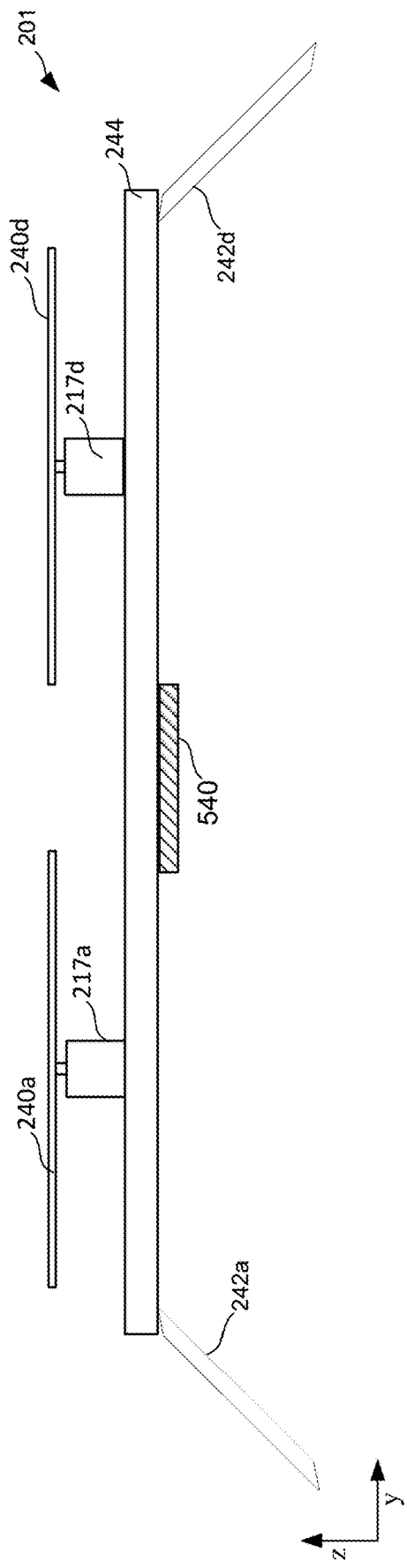
FIG. 3 shows an example of some components of an embodiment of a quadcopter.

FIG. 3 shows a simplified side-view of UAV 201, which includes motors 217a, 217d (two of four motors 217a-d are visible in this view) and attached propellers 240a, 240d. Also shown are legs 242a and 242d (two of four legs are visible in this view) that are attached to the bottom surface of chassis 244 and support chassis 244 when on the ground. Electric motors 217a-d are mounted to the top surface of chassis 244 and drive corresponding propellers. The Hub 540 is attached to an underside of the UAV 201. In another embodiment, the Hub 540 resides within the body of the UAV 201.

In some cases, a UAV such as a drone may be used to transport a payload. A payload may be attached to the UAV in various ways. Some, but not necessarily all, payloads may need power and to communicate with the UAV 201.

Figure 4A:
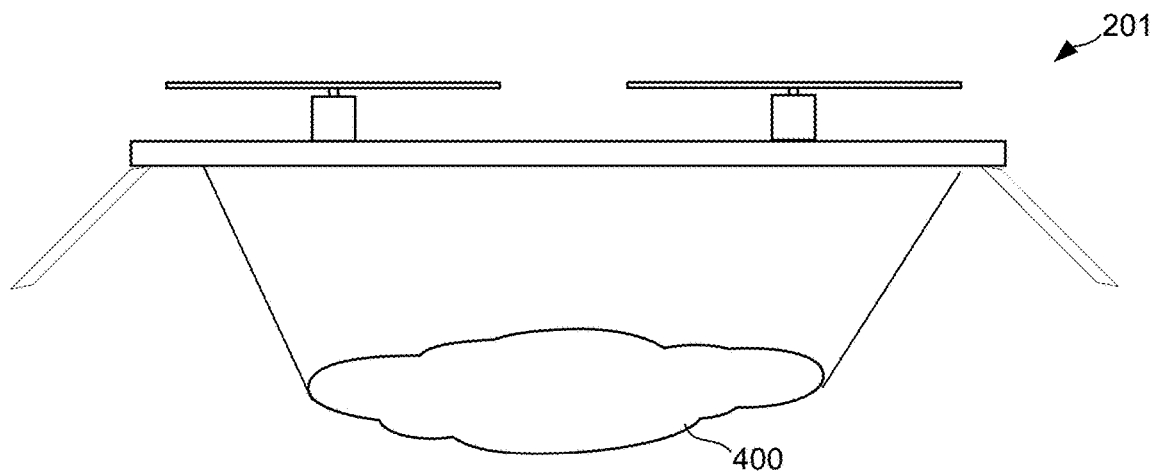
FIGS. 4A, 4B illustrate UAVs carrying payloads.

FIG. 4A shows an example of a payload 400 that is loosely attached to UAV 201 (e.g., by netting, webbing, ropes, chords, bungee cords, or other material). Such attachment may be performed manually (e.g., using hooks, carabineers, cable ties, knots, or otherwise) using whatever attachment points may be available on exterior surfaces of a UAV. One disadvantage of this arrangement is that a loosely attached payload may cause instability during flight. A loosely attached payload may have a pendulum effect and may make flying a UAV difficult or even cause a UAV to crash.

Figure 4B:
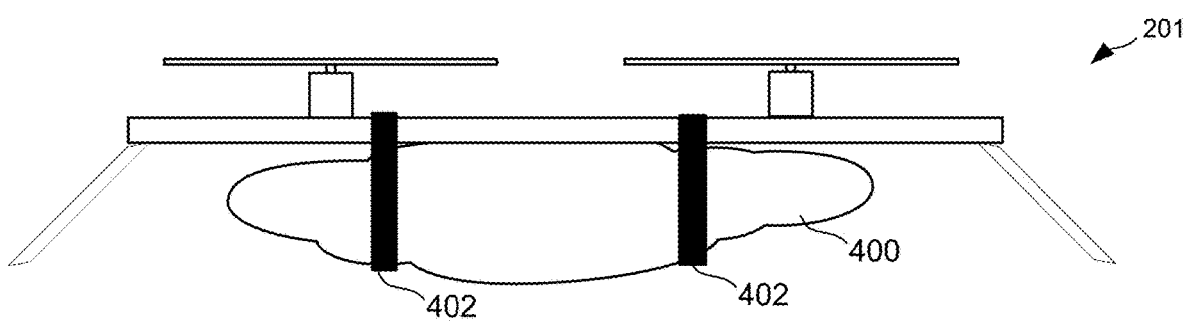

FIG. 4B shows an alternative arrangement in which payload 400 is closely attached to UAV 201. FIG. 4B shows straps 402, which bind payload 400 to UAV 201 and may mitigate or avoid a pendulum effect (alternative attachment components such as cable ties or bungee cord may be used instead of straps).

Attachment of payloads (e.g., as shown in FIGS. 4A-B) may be improvised according to circumstances (e.g., dimensions of UAV and payload, availability of attachment points, materials available, etc.), may require significant time for attachment and subsequent detachment of the payload. In some cases, attachment may not be reliable (especially when performed by untrained individuals) and improper attachment may damage drone components and/or impact flight characteristics.

In some cases, it may be desirable to drop a payload in response to a command from a remote control device (e.g., remote control device 105). Improvised attachment (e.g., as illustrated in FIGS. 4A-4B) may not be compatible with remote controlled dropping of a payload because some user intervention is required. While a UAV may be designed for remote controlled dropping of a payload, such a UAV may not always be available, and it may be desirable to adapt UAVs that were not originally designed with such capability. Significant modification and/or customization of a UAV may be required to allow remote controlled dropping of a payload, which may require specialized components and skilled individuals.

Aspects of the present technology are directed to facilitating adaptation of UAVs for transporting a payload and for dropping the payload ("drop-payload") in response to a command (e.g., in response to a command from a remote control).

According to an example, a UAV Mechanical Release Device (MRD) is provided that includes a quick-release UAV-attachment mechanism and a payload latch mechanism to secure and release a drop-payload. A latch actuator (e.g., a motor such as a servo motor) connected to the payload latch mechanism enables movement of the payload latch mechanism between closed and open positions to respectively hold and release the drop-payload. While examples described below refer to a closed position to capture a drop-payload and an open position to release a drop-payload, other positional states may additionally or alternatively be provided to allow capture and release (e.g., more than two discrete positions and/or a range of positions between open and closed positions).

Figure 5A:
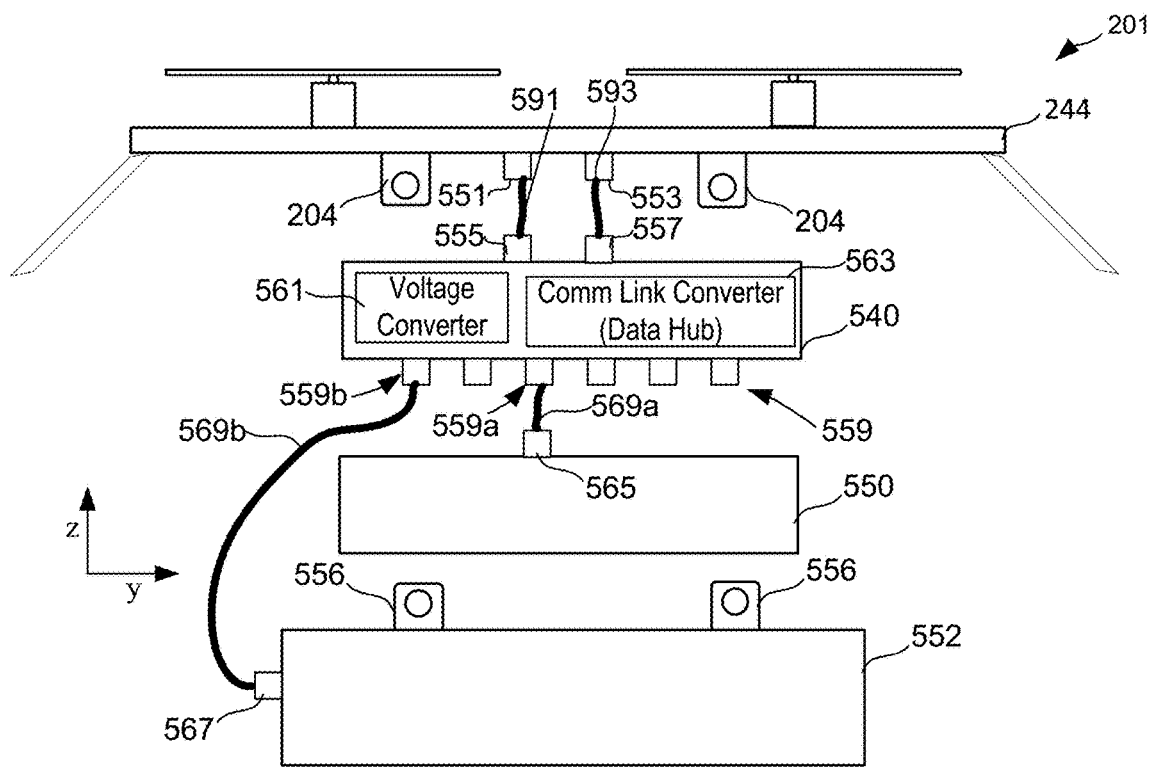
FIGS. 5A, 5B illustrate an example of a UAV with an embodiment of a Hub and Mechanical Release Device (MRD) and drop-payload.

FIG. 5A shows an exploded view example of a system having a UAV 201 and peripherals. The system has a Hub 540, MRD 550, and payload 552 (unattached in this view). In this example, the Hub 540 is between the MRD 550 and the UAV 201. In another embodiment, the Hub 540 resides within the MRD 550. In yet another embodiment, the Hub 540 resides within the UAV 201. In one embodiment, the MRD 550 attaches to the lugs 204, with the Hub 540 attached to the UAV 201 between the UAV and the MRD 550. In another embodiment, the Hub 540 attaches to the lugs 204.

The UAV 201 has a UAV output power interface 551 and a UAV communication interface 553. The Hub 540 has a corresponding Hub input power interface 555 and a Hub communication interface 557. A power cable 591 connects the UAV output power interface 551 to the Hub input power interface 555. The power cable 591 may have a power line to receive power (e.g., a supply voltage) from the UAV 201. A comm cable 593 connects the UAV communication interface 553 with Hub communication interface 557. The comm cable 593 provides a physical pathway for data transfer to and from the UAV 201. Although two cables 591, 593 are depicted in FIG. 5A, in another embodiment a single cable is used for both power and a communication link. In an embodiment, the communication interfaces 553/557 and cable 593 are MAVLink. In an embodiment, the communication interfaces 553/557 and cable 593 are Ethernet.

The Hub 540 has a number of peripheral ports 559 that provide power and a communication pathway to peripheral electronic devices. The peripheral electronic devices may include the MRD 550, the payload 552, or some other peripheral electronic device. A cable 569a is depicted between Hub peripheral port 559a and MRD interface 565. A cable 569b is depicted between Hub peripheral port 559b and peripheral device port 567. The various peripheral devices could have different power (e.g., voltage) requirements, as well as use different communication protocols. Moreover, the various peripheral devices could use different types of physical connectors for power/communication. For example, the MRD port 565 and the payload/peripheral port 567 could use different physical connections, different voltage levels, and/or different communication protocols. Also, different payloads/peripherals 552 could use different physical connections, different form factors different voltage levels, and/or different communication protocols.

The Hub 540 is able to interface to a wide variety of peripheral electronic devices. The voltage converter 561 will convert the voltage from UAV output power interface 551 to the voltage level that is needed by the peripheral electronic device(s). The comm link converter 563 will perform communication translation such that the Hub 540 and UAV 201 may communicate using one communication protocol and the Hub 540 and the peripheral electronic device 552 (or MRD 550) may communicate using a different communication protocol. The comm link converter 563 may also be referred to as a Data Hub. The Data Hub enables sharing of data between two endpoints. One endpoint is in the UAV (e.g., the flight controller). The other endpoint is in the peripheral electronic device. The MRD 550 and the payload 552 are examples of peripheral electronic devices 112 (see FIG. 1).

In one embodiment, the cables 569*a*, 569*b* between a Hub peripheral port 559 on the Hub 540 and a port of a peripheral device (e.g., ports 565, 567) allows the peripheral electronic devices to have different ports than the peripheral ports 559 on the Hub 540. For example, Hub peripheral ports 559 could be USB ports, whereas the ports of the peripheral electronic devices could be compliant with, for example, UART, I2C, CAN, SPI, Ethernet, etc. In one embodiment, cable 569*b* has information stored therein that allows the Hub 540 to learn what voltage level and communication protocol is used by the peripheral electronic device 552. In one embodiment, the cable 569*b* has non-volatile memory (e.g., EEPROM) that stores the power and/or communication protocol information. Thus, the Hub 540 may read the EEPROM (or other non-volatile memory) to learn what voltage level is needed and what communication protocol will be used by the peripheral electronic device 552. The voltage converter 561 will then convert the voltage from the UAV output power interface 551 to the suitable voltage level for the peripheral electronic device 552 and provide that voltage on port 559*b*. Moreover, the comm link converter 563 will provide the bridge between the peripheral electronic device 552 and the UAV 201 to allow the peripheral electronic device 552 and the UAV to communicate even if different communication protocols are used by the peripheral device 552 and UAV 201.

Further details of the payload and its attachment to the UAV 201 will now be discussed. In some embodiments, the payload 552 may be dropped form the UAV 201. However, it is not required that the payload/peripheral device 552 be dropped from the UAV 201. The payload/peripheral device 552 could be a sensor, for example, such as a LIDAR sensor. Lugs 204 extend from UAV 201. Lugs 204 may be attached (e.g., bolted, welded, riveted or otherwise attached) to UAV 201 (e.g., to a UAV chassis or other component). MRD 550 is configured for attachment to lugs 204 by one or more quick-release mechanisms. Payload 552 includes lugs 556. MRD 550 is configured to hold lugs 556 and thereby hold payload 552 and to release lugs 556 and thereby optionally release payload/peripheral device 552 in response to a command (e.g., from a remote control).

Figure 5B:
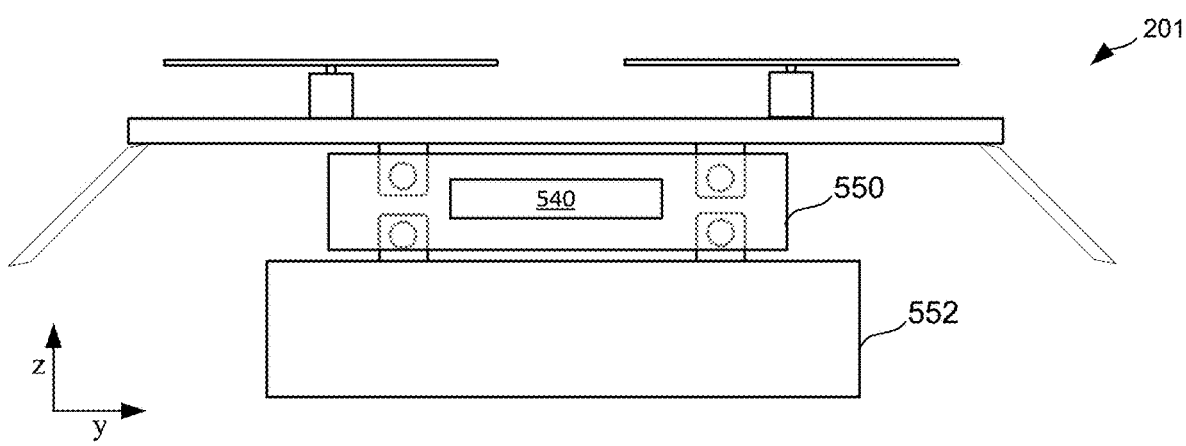

In some embodiments, the Hub 540 resides within the MRD 550. FIG. 5B illustrates MRD 550 attached to UAV 201 and holding payload/peripheral device 552. In some embodiments, the Hub 540 resides within the MRD 550. However, the Hub 540 could be located elsewhere such as within the UAV 201 or attached to the UAV 201 between the MRD 550 and UAV 201. In a configuration, UAV 201 can fly with payload/peripheral device 552 securely attached. Then, in response to a command, MRD 550 can optionally release payload/peripheral device 552 at a desired location (e.g., while in the air or after landing). Subsequently, UAV 201 (with MRD 550 attached) can continue flying (or take off if it has landed) and continue to another location. In some examples, MRD 550 may pick up a payload/peripheral device without manual intervention (e.g., a UAV may be lowered from a position above a payload/peripheral device, the MRD may engage the payload/peripheral device and then the UAV may take off with the payload/peripheral device secured to the UAV by the MRD). To reconfigure UAV 201 for other operations that do not require remote controlled release of a payload/peripheral device, MRD 550 can simply be detached (e.g., using quick-release attachment features).

Lugs 556 may be positioned for capture by corresponding engagement features of MRD 550. Payload/peripheral device 552 may be a container that is designed to interface with MRD 550 so that lugs 556 are appropriately configured (e.g., shape and locations of lugs correspond to engagement features of the MRD).

In some cases, for example, to accommodate a wide range of payload/peripheral devices, a payload/peripheral device plate or frame may be provided that includes lugs at appropriate locations for capture by an MRD. Such a plate or frame may be compact, lightweight and have a range of attachment points suitable for attaching various payload/peripheral devices without the need for customized containers.

Figure 6A:
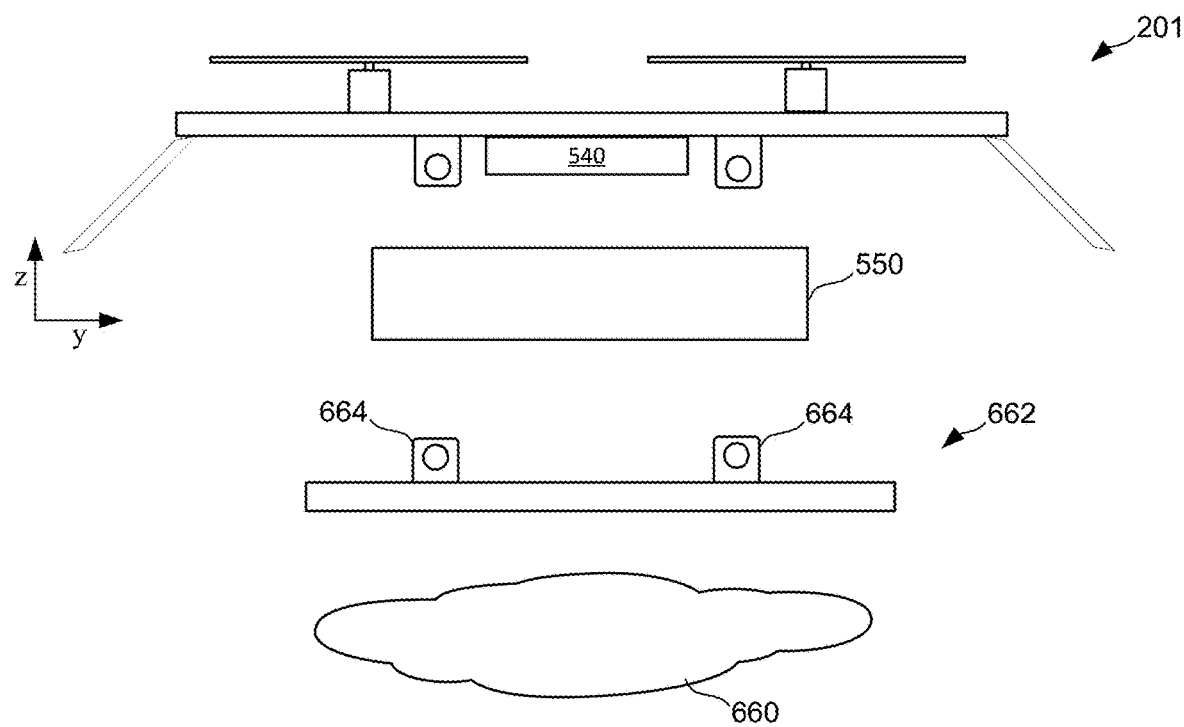
FIG. 6A, 6B, 6C illustrate an example of a UAV with an embodiment of a Hub and MRD and drop-payload that includes a drop-plate.

FIG. 6A shows an example of UAV 201, Hub 540, MRD 550, a payload 660 and a drop-plate 662 (all shown separately in an unattached configuration). The Hub 540 is attached to the underside of the UAV 201. There may also be interfaces (see 591, 593, 555, 557, 559 in FIG. 5A), as described above but these are not depicted in FIG. 6A. Also the cables are not depicted in FIG. 6A. Drop-plate 662 includes lugs 556, which are arranged at appropriate locations for capture and release by MRD 550. While two lugs 664 are shown in this view, any number of lugs may be provided (e.g., four) according to the configuration of MRD 550.

Figure 6B:
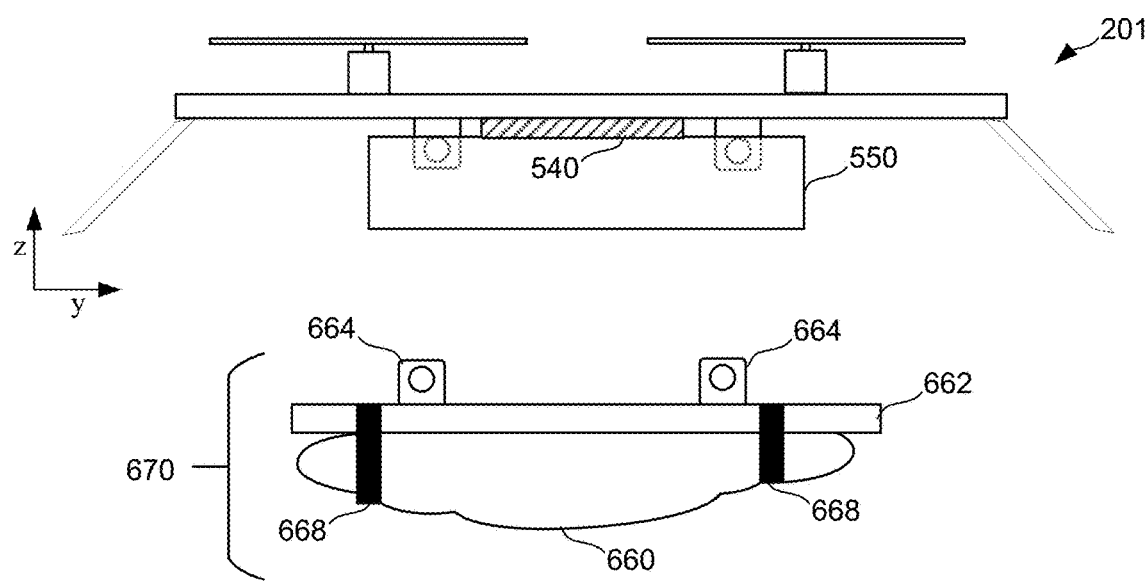

FIG. 6B shows an example of UAV 201, Hub 540, MRD 550, payload 660 and drop-plate 662 with MRD 550 attached to UAV 201 (e.g., by a quick-release mechanism). Payload 660 is attached to drop-plate 662 to form payload/peripheral device 670 (the combination of payload 660 and drop-plate 662 is dropped as a single unit and may be considered a payload/peripheral device). The attachment components used to attach a payload to a drop-plate may depend on the payload. For example, straps, netting, webbing, rope, bungee cord, or other material may be used and may be secured using buckles, hooks, carabineers, cable ties, knots, or otherwise. FIG. 6B shows payload 660 attached to drop-plate 662 by two straps 668, which may be secured with buckles (e.g., quick-release buckles). Drop-plate 662 may be in the form of a lightweight frame that includes a number of openings between frame members that allow straps, ropes or other attachment components to be looped through and/or attachment of hooks, carabineers or other hardware. Unlike a custom-designed container, such a drop-plate does not limit the physical dimensions of a payload and can accommodate a variety of irregularly sized/shaped payloads. A payload may be prepared by attachment to a drop-plate ahead of time (e.g., without the presence of a UAV) and may then be rapidly attached to a UAV equipped with an MRD. Attachment of a payload/peripheral device (e.g., with a drop-plate) may be performed manually (e.g., lifting the drop-plate to place lugs in the correct locations) or without manual intervention (e.g., lowering a UAV equipped with a MRD down onto a payload/peripheral device with lugs aligned with corresponding features of the MRD and then engaging the lugs with engagement features of the MRD).

Figure 6C:
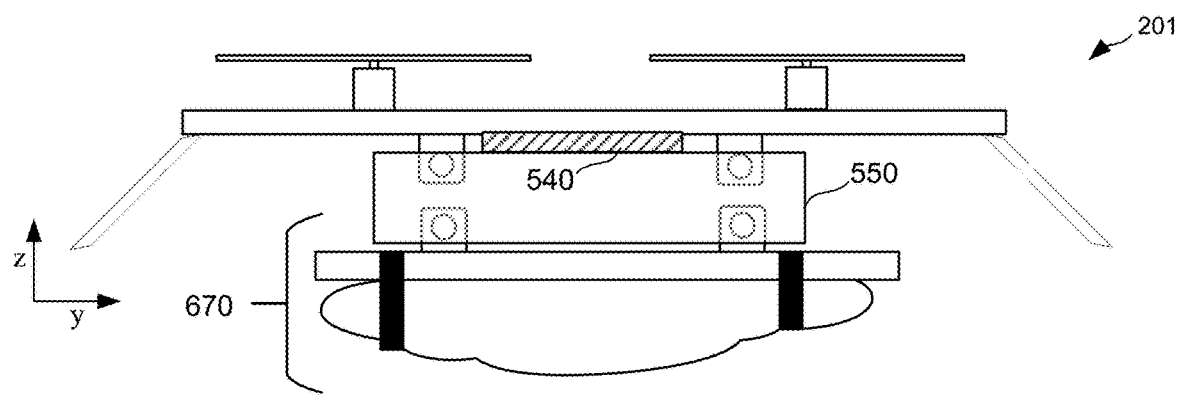

FIG. 6C shows an example of UAV 201 with MRD 550 holding payload/peripheral device 670. Hub 540 is attached to the underside of the UAV 201. UAV 201 may fly with payload/peripheral device 670 securely held in this configuration. Payload/peripheral device 670 may be released by MRD 550 at any time in response to a command. For example, payload/peripheral device 670 may be released while UAV 201 is in the air or after it has landed. A command to release payload/peripheral device 670 may be sent from a remote control (e.g., through communication circuits of UAV 201 or directly to MRD 550).

Figure 7:
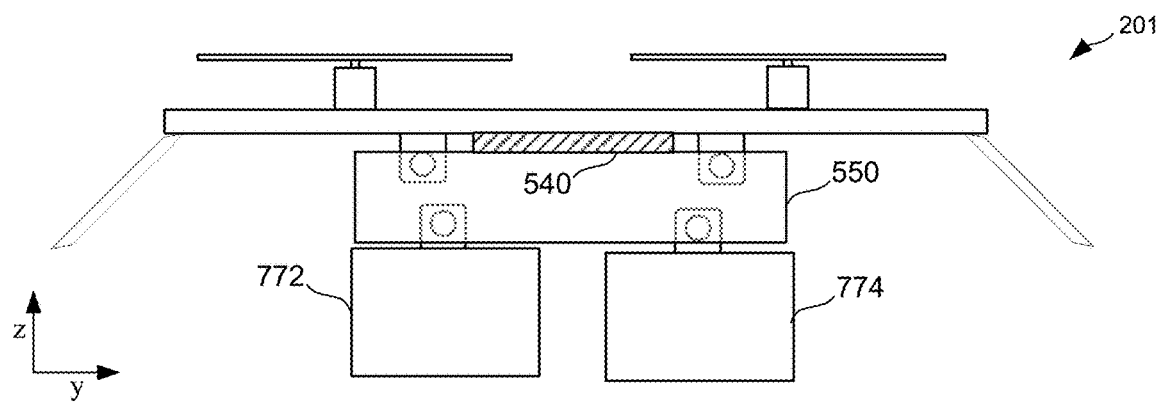
FIG. 7 illustrates an example of a UAV with an embodiment of a Hub and MRD and multiple drop-payloads.

While FIGS. 5A-6C show examples that include a UAV Hub 540 and MRD with a single payload/peripheral device, more than one payload may be similarly carried by a UAV using an appropriate MRD. FIG. 7 shows an example of UAV 201, Hub 540, and MRD 550 with first payload/peripheral device 772 and second payload/peripheral device 774. In some cases, an MRD (e.g., MRD 550) may be adaptable to hold varying numbers of payload/peripheral devices. For example, instead of holding one payload/peripheral device that has four lugs, an MRD may hold two smaller payload/peripheral devices that each have two lugs or four smaller payload/peripheral devices that each have a single lug. In examples in which an MRD holds multiple payload/peripheral devices, the payloads may be dropped together or separately depending on the configuration of the MRD and the command received (e.g., a command may specify which payload/peripheral device(s) to drop).

Figure 8:
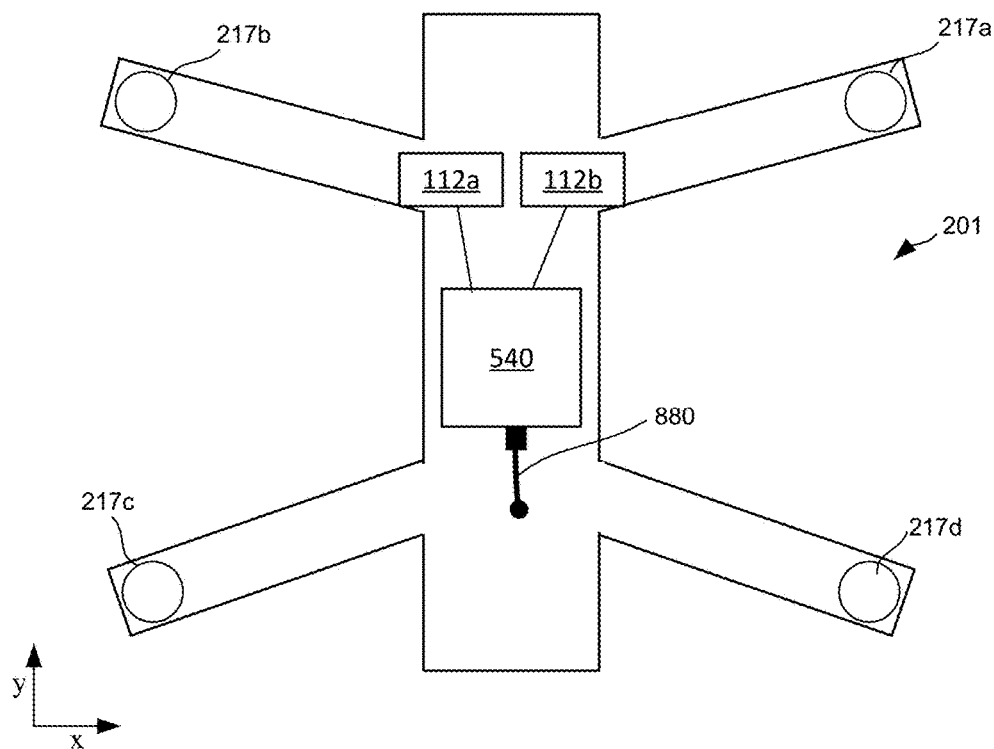
FIG. 8 illustrates an example of a UAV with an embodiment of a Hub and MRD.

FIG. 8 shows a view of UAV 201 (e.g., view from below along the z-direction) with Hub 540 attached to its underside. In addition to being mechanically attached to UAV 201 by quick-release attachment features (not shown in this view), Hub 540 is electrically connected to UAV 201 by a cable 880. Cable 880 may provide power from UAV 201 (e.g., from voltage source and regulator 213) to Hub 540. Cable 880 may also provide one or more physical communication channels for communication between UAV 201 and Hub 540. For example, commands or other communication may be sent from UAV 201 (e.g., from wireless receiver 215 or flight controller 211 to Hub 540). Such commands may be received by communication circuits of UAV 201 (e.g., wireless receiver 215) from a remote control (e.g., remote control 105) and relayed to Hub 540 and/or may be generated by UAV 201. Cable 880 is one embodiment of cables 591, 593 (see FIG. 5A). The hub 540 connects to peripheral electronic devices 112a, 112b. The hub 540 provides power to the peripheral electronic devices 112a, 112b, as described herein. The hub 540 serves as a data hub between an endpoint in the UAV 201 and endpoints in the peripheral electronic devices 112a, 112b, as described herein.

Figure 9:
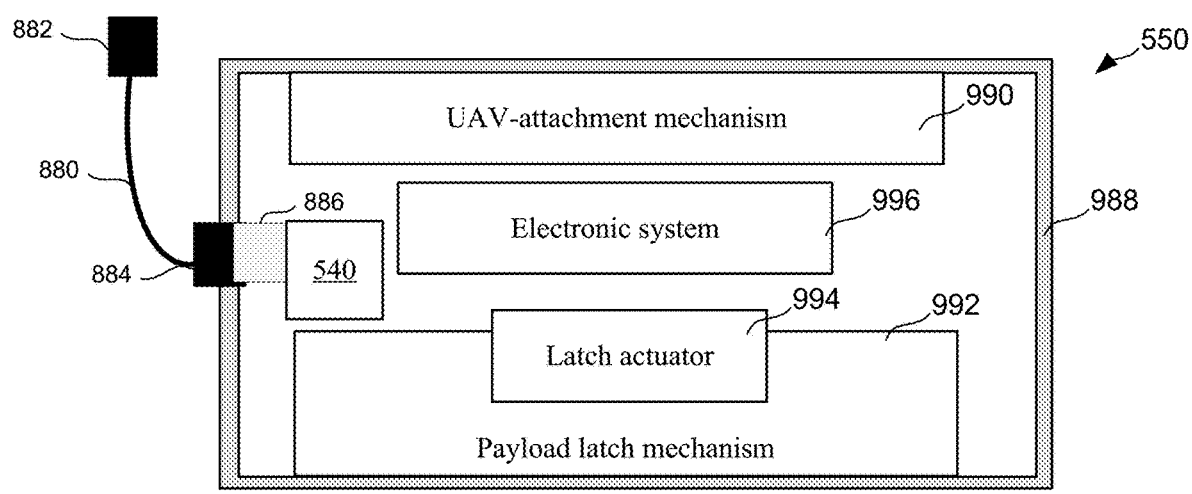
FIG. 9 shows a block diagram of certain components of an example implementation of MRD with an integrated Hub.

An MRD having a Hub 540 may be implemented in various ways. FIG. 9 shows a block diagram of certain components of an example implementation of MRD 550 with an integrated Hub 540. Components are shown as blocks in FIG. 9 for illustration purposes. FIG. 9 is not intended to represent the shapes, locations, or other details of the components shown and is not intended to show all components of an MRD (an MRD may have more or fewer components than those illustrated).

MRD 550 includes cable 880 to connect MRD 550 to a UAV. Cable 880 includes connector 882 to connect to a corresponding connector on a UAV and connector 884 to connect to a corresponding connector 886 on Hub 540. The Hub 540 may reside on a PCBA board within the MRD 550.

MRD 550 includes an enclosure 988, which extends about other components to provide protection structural support. Such an enclosure may be substantially sealed (e.g., waterproof) or partially open (e.g., a framework with multiple openings). Openings are provided in enclosure 988 for lugs of a UAV and for lugs of one or more payload/peripheral device.

MRD 550 includes a UAV-attachment mechanism 990 to attach the UAV mechanical release device to a UAV. The UAV-attachment mechanism 990 may be a quick-release mechanism that allows MRD 550 to be rapidly attached and detached. For example, UAV-attachment mechanism 990 may include a plurality of pins (e.g., captured pins) to engage corresponding lugs of the UAV (lugs may have holes to accommodate pins). The captured pins may extend through enclosure 988. Other quick-release mechanisms may also be used.

MRD 550 includes one or more payload latch mechanism 992 to secure and release payload/peripheral device(s). The payload latch mechanism(s) may include one or more engagement features to engage corresponding features of the payload/peripheral device (e.g., to engage lugs of a payload/peripheral device such as lugs 556 and 664). Engagement features may be movable by the latch mechanism between a closed configuration that holds the payload/peripheral device(s) and an open configuration that releases the payload/peripheral device(s).

MRD 550 includes a latch actuator 994 connected to the payload latch mechanism 992 to move payload latch mechanism 992 between the closed and open positions (e.g., to release the payload/peripheral device or to allow insertion of a payload/peripheral device lug when loading a payload/peripheral device). Latch actuator 994 may be an electrical, pneumatic, hydraulic, or other actuator that provides mechanical force to move latch components. An example of a suitable latch actuator is an electric motor (e.g., servo motor, stepper motor, or other electric motor).

MRD 550 includes an electronic system 996, which may include various electronic components. Electronic system 996 may be connected to a UAV by cable 880 (through Hub 540), which may provide power and communication from the UAV to electronic system 996. Electronic system 996 may also be in communication with components of the UAV through cable 880. The Hub 540 may include power circuits (e.g., one or more power controller) to receive an incoming power supply and generate suitable output voltages for components of MRD 550 (e.g., converting a 24 volt power supply received from a UAV to other voltages used by MRD components). The Hub 540 may also provide power to peripherals attached to MRD 550.

Electronic system 996 may also include control circuits to control components of MRD 550, including, for example, latch actuator 994, which in turn controls opening and closing of payload latch mechanism 992. Control circuits may include one or more processor and one or more memory. For example, a processor may operate using software stored in a memory and may be configured by such software. Electronic system 996 may include one or more sensors. The Hub 540 may provide power for the sensors. The Hub 540 may provide a communication bridge between the sensors and the UAV. For example, the one or more sensors may include one or more cameras, such as an infra-red or thermal camera and/or a visible (EO) camera (camera operating in the range of visible light, approximately 380-700 nm wavelength). The one or more sensors may include a rangefinder (e.g., laser rangefinder), which may be directed downwards to provide an accurate altitude measurement. Some or all sensor data (e.g., image and/or altitude data) may be sent to a UAV through cable 880 and may be sent from the UAV to a remote control or other remote device (e.g., so that a user can determine if the UAV is in the right location to drop the payload/peripheral device). In some cases, image recognition or other logic in electronic system 996 or in a UAV may use data from sensors to identify a location (e.g., drop location) and may respond to identification of a location without an external command (e.g., dropping a payload/peripheral device at a recognized location without a command from a remote control).

While the example of FIG. 9 uses components of the UAV for communication with a remote control (e.g., control unit 105), communication between components of MRD 550 and a remote control may be implemented in various ways using other control components that are not in the UAV. In an example, electronic system 996 of MRD 550 may include circuits for sending data directly to and receiving data (e.g., commands) directly from a remote control (e.g., a transmitter/receiver may be included in electronic system 996). Circuits enabling direct communication with a remote control may be in addition to components enabling communication with a UAV (e.g., cable 880) or may be instead of such components (e.g., MRD 550 may not have any communication with the UAV to which it is attached). Cable 880 may simply provide power (not communication) in this arrangement or MRD 550 may include a battery for power so that no cable connects MRD 550 to the UAV.

Figure 10:
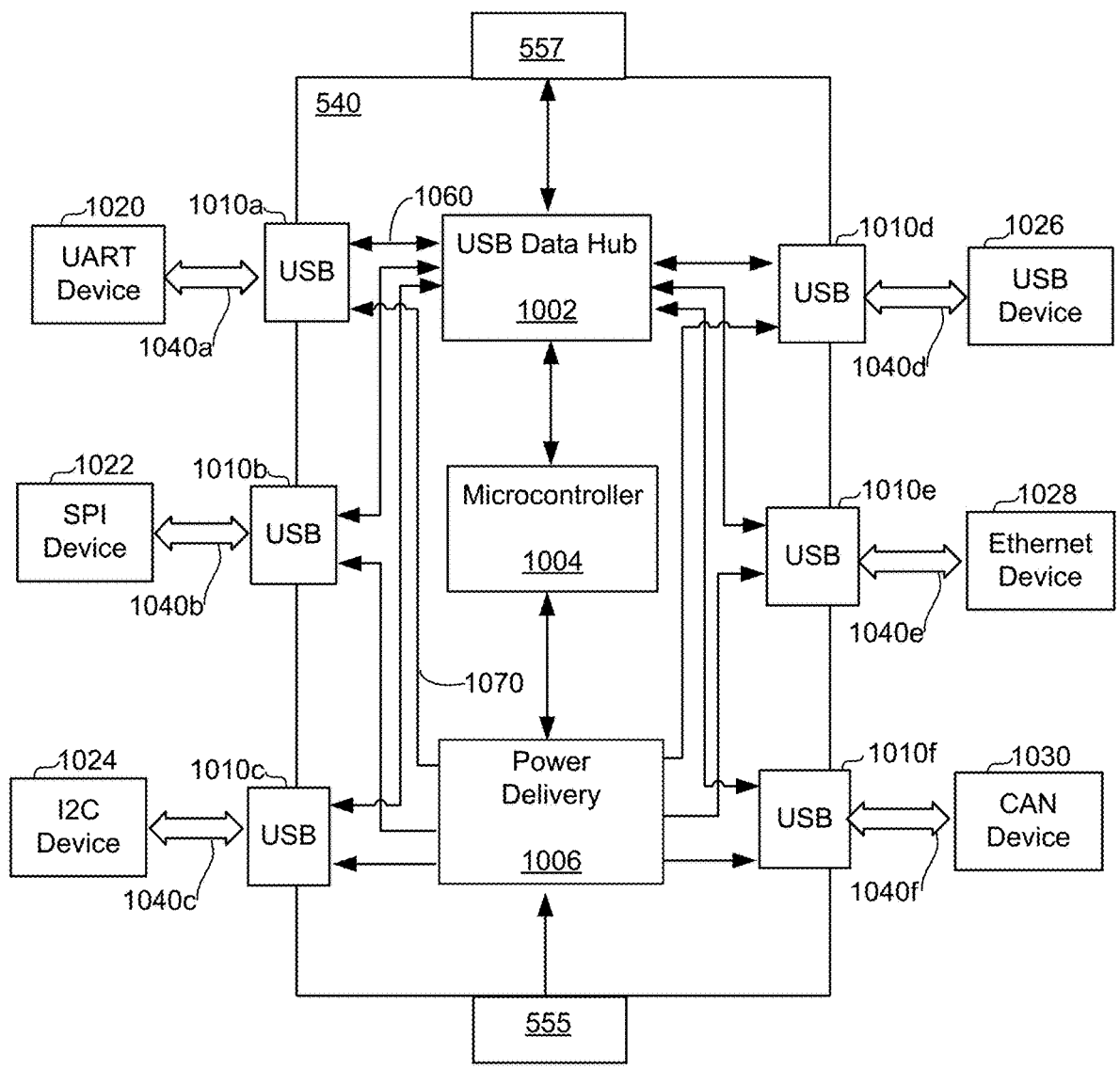
FIG. 10 is a block diagram that provides further details of one embodiment of the Hub.

FIG. 10 is a block diagram that provides further details of one embodiment of the Hub 540. In an embodiment, the Hub 540 is able to provide a plug-and-play interface to peripheral electronic devices that may have different power and/or communication protocol requirements. FIG. 10 depicts an embodiment in which the Hub 540 has a number of USB peripheral ports 1010a-1010f. The USB peripheral ports 1010 are each able to receive a USB connector. The USB peripheral ports and corresponding USB connectors may have a wide range of form factors including, but not limited to USB-A, USB-B, Micro-USB, Mini-USB, or USB-C. The USB peripheral ports 1010 are one example of Hub ports 559 (see FIG. 5A). The Hub peripheral ports 559 are not required to be USB ports. In the example in FIG. 10 all of the Hub ports are USB ports. However, the Hub ports are not required to all be of the same type. For example, some Hub peripheral ports could be USB ports and other Hub peripheral ports could be other types of ports.

A number of different types of peripheral electronic devices are attached to the Hub 540. Examples of peripheral electronic devices include, but are not limited to, a LIDAR sensor, a rangefinder, an IR camera, and an EO camera. The peripheral electronic devices are labeled in FIG. 10 based on a protocol and/or physical interface used by the device for communication. These types of peripheral electronic devices include in this example, a UART (Universal Asynchronous Receiver-Transmitter) device 1020, an SPI (Serial Peripheral Interface) device 1022, an I2C (Inter-Integrated Circuit) device 1024, a USB device 1026, an Ethernet device 1028, and a CAN (Controller Area Network) device 1030. For example, a UART peripheral device is defined herein as a peripheral electronic device that employs UART as a hardware communication protocol with the Hub 540. UART may be used for serial communication over a serial port. Moreover, a UART peripheral device will have a suitable port for use with the UART hardware communication protocol. An SPI peripheral device is defined herein as a peripheral electronic device that employs the Serial Peripheral Interface Standard as a communication protocol with the Hub 540. The Serial Peripheral Interface (SPI) is a synchronous serial communication interface specification used for short-distance communication, primarily in embedded systems. Moreover, an SPI peripheral device will have a suitable port for use with the SPI Standard. An I2C peripheral device is defined herein as a peripheral electronic device that employs the I2C communication protocol to communicate with hub 540. Moreover, an I2C peripheral device will have a suitable port for use with the I2C communication protocol. An Ethernet peripheral device is defined herein as a peripheral electronic device that employs any of the Ethernet standards as a communication protocol with hub 540. Moreover, an Ethernet peripheral device will have a suitable port for use with an Ethernet communication protocol. For example, an Ethernet peripheral electronic device may have an Ethernet port for accepting an Ethernet cable. A CAN peripheral device is defined herein as a peripheral electronic device that employs the CAN bus standard as a communication protocol with the Hub. Moreover, a CAN peripheral electronic device will have a suitable port for use with the CAN bus standard.

Each peripheral electronic device is connected to one of the USB ports 1010 by a cable 1040. In one embodiment, each cable 1040 contains a USB converter. In an embodiment, the USB converter converts between USB and another type of connector and/or protocol. In one embodiment, at least some of the cables 1040 have a non-volatile memory (e.g., EEPROM) that stores device communication protocol and power (e.g., voltage) requirements. Each cable 1040 may have a first connector to connect to a corresponding port on a peripheral device and second connector to connect to a corresponding port (e.g., USB port 1010) on Hub 540. In an embodiment, cable 1040a converts between UART and USB. In an embodiment, cable 1040b converts between SPI and USB. In an embodiment, cable 1040c converts between I2C and USB. In an embodiment, cable 1040d need not perform any conversion as cable 1040d connects to a USB device 1026. In one embodiment, the connectors at the two ends of cable 1040d have different USB form factors (e.g., USB-A, USB-B) to convert between the two USB form factors. In an embodiment, cable 1040e converts between Ethernet and USB. In an embodiment, cable 1040f converts between CAN and USB.

The Hub 540 has a USB data hub 1002, a microcontroller 1004, and power delivery 1006. The USB data hub 1002 has data pathways 1060 connected to each USB port 1010 and to the data connection 557 to UAV. The USB data hub 1002 therefore mediates communication (e.g., mediate data transfer or data communication) between the UAV 201 and the peripheral electronic devices. The USB data hub 1002 may use a first communication protocol to communicate with an endpoint in a specific peripheral electronic device and a second communication protocol to communicate with an endpoint in the UAV 201 (e.g., flight controller in UAV).

The power delivery 1006 is connected to the power connector 555 to receive power from the UAV 201. The power delivery 1006 is connected to each USB port 1010 by pathways 1070 to provide a suitable voltage level to the USB port 1010. The power delivery 1006 may step down the voltage received from the UAV 201. In one embodiment, the power delivery 1006 has a battery eliminator circuit (BEC) that may be used to step down the voltage from the UAV. For example, the UAV 201 may provide 24V DC, which could be stepped down to any fraction of 24V DC. However, stepping up the voltage from the UAV 201 is also possible with, for example, a charge pump.

The microcontroller 1004 oversees operation of the Hub 540. In an embodiment, the microcontroller 1004 reads non-volatile memory in the cables 1040 to learn what voltage and/or communication protocol should be used for the peripheral electronic device connected to the Hub 540. The microcontroller 1004 instructs the power delivery 1006 what supply voltage level should be provided to each USB port 1010. The microcontroller 1004 may also interface with the USB data hub to facilitate the communication between the UAV 201 and the peripheral electronic devices.

In one embodiment, the components on the hub 540 reside on a PCBA. The PCBA may be within a heat sinked enclosure. The hub 540 and cables 1040 are one example of a hub system. The combination of one or more of the microcontroller 1004 and/or the USB data hub 1002 may be referred to as one or more control circuits. The USB data hub may be implemented in software, hardware, or a combination of software and hardware. The microcontroller 1004 may be implemented in software, hardware, or a combination of software and hardware.

Figure 11:
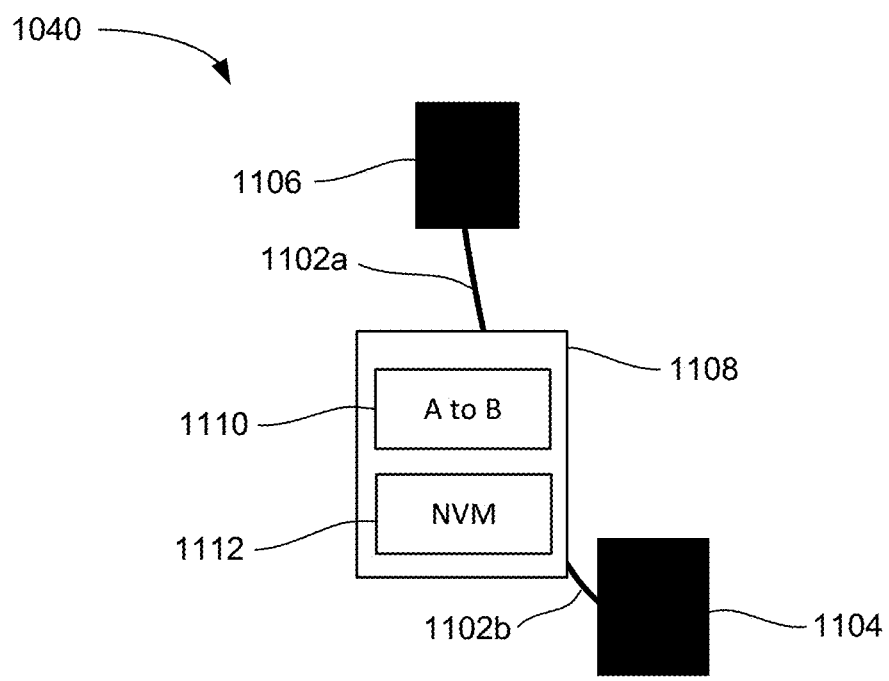
FIG. 11 depicts one embodiment of a cable that may be used to connect a peripheral device to the Hub.

FIG. 11 depicts one embodiment of a cable 1040 that may be used to connect a peripheral device to the Hub 540. The term "cable" is used broadly to include any medium that provides a physical and communication connection between two connectors that connect to a peripheral port of the Hub 540 and a port of the peripheral device, respectively. The cable 1040 has a first connector 1106 to connect to a corresponding port on a peripheral device and second connector 1104 to connect to a corresponding port (e.g., USB port 1010) on Hub 540. Connector 1104 may have a number of pins, receptables, or other elements to mate with peripheral port on Hub 540. Connector 1106 may have a number of pins, receptables, or other elements to mate with a port on the peripheral electronic device. Connector 1104 and Connector 1106 may have different form factors. Connector 1104 and Connector 1106 may have a different number of signal lines (e.g., pins or the like). A different communication protocol may be used over Connector 1104 than over Connector 1106. In some cases, one connector is used for serial communication and the other connector is used for parallel communication.

Between the two connectors 1104, 1106 is a transmission medium 1102 and board 1108. The board 1108 may be a PCBA board, for example. The transmission medium 1102 contains pathways to transfer power (e.g., voltage) and data. The transmission medium 1102 may contain electrical wires, optical fibers, etc. The transmission medium is divided into a first portion 1102a that connects to first connector 1106 and a second portion 1102b that connects to second connector 1104. The first portion 1102a will have suitable pathways that are compatible with first connector 1106. The second portion 1102b will have suitable pathways that are compatible with second connector 1104. The board 1108 contains A to B converter circuit 1110 which is able to make conversions to account for different pin configurations, etc. of the first connector 1106 and second connector 1104. The A to B converter circuit 1110 also makes translations to account for different pathways in first portion 1102a and second portion 1102b. Therefore, the cable 1040 may be referred to as a converter cable. As one example, the A to B converter circuit 1110 could convert between USB and UART. In one embodiment, one or both portions of the transmission medium 1102 is/are not present. Instead the first connector 1106 and/or the second connector 1104 may reside on the edge of the board 1108.

The board 1108 also contains non-volatile memory (NVM) 1112. In one embodiment, the non-volatile memory 1112 is EEPROM, although other non-volatile memory may be used. The non-volatile memory 1112 stores configuration information about power (e.g., voltage level) and/or communication protocol used by the peripheral electronic device that will connect to the first connector 1106. In an embodiment, the Hub 540 will read the configuration information on the non-volatile memory 1112 to determine what voltage level to provide to the second connector 1104. In an embodiment, the Hub 540 will read the configuration information on the non-volatile memory 1112 to determine what communication protocol to use when communicating with the peripheral electronic device connected to the cable 1040.

Figure 12:
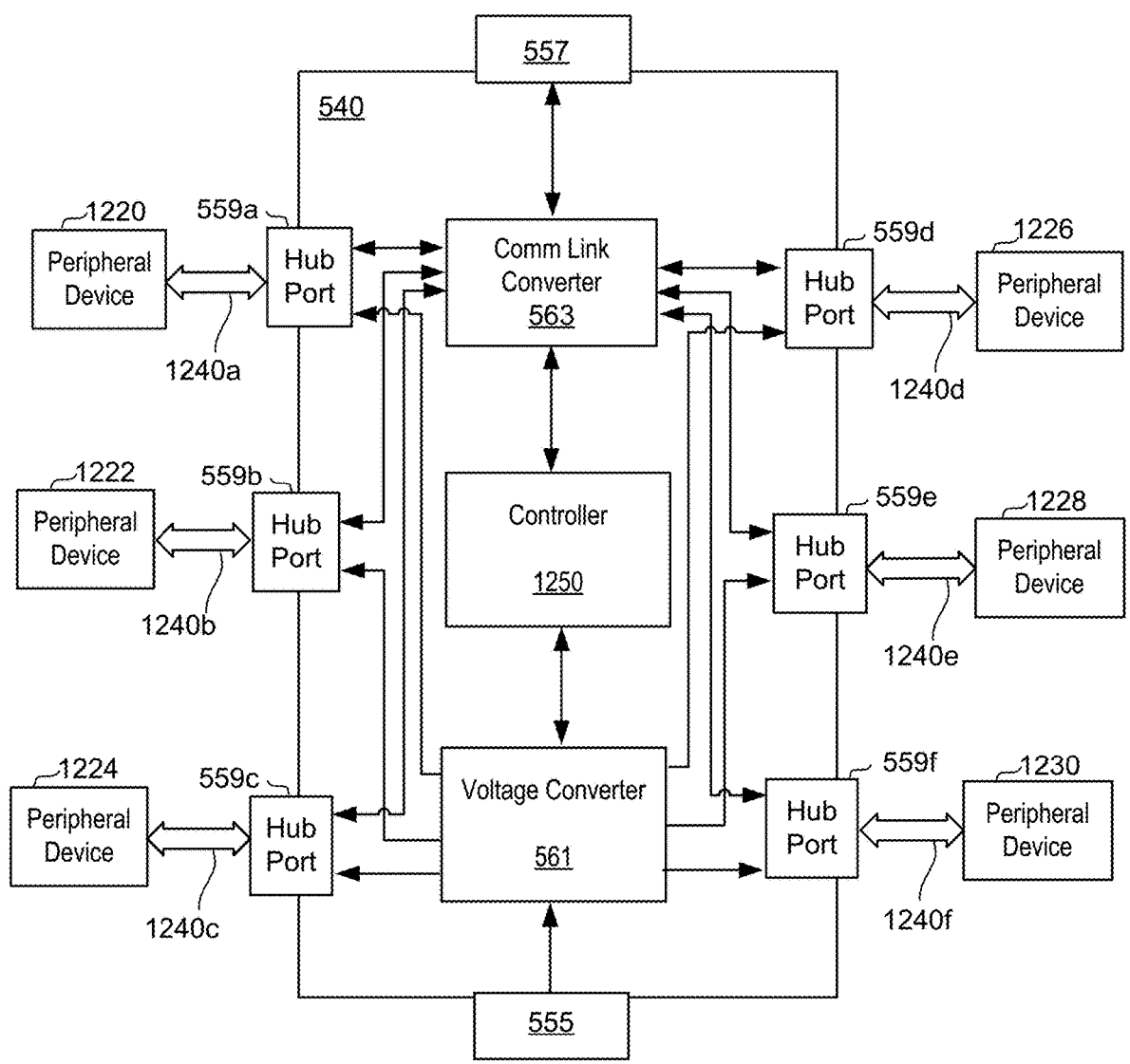
FIG. 12 is a block diagram that provides further details of one embodiment of the Hub.

FIG. 12 is a block diagram that provides further details of one embodiment of the Hub 540. In an embodiment, the Hub 540 is able to provide a plug-and-play interface to peripheral electronic devices that may have different power (e.g., power source voltage) and/or communication protocol requirements. FIG. 12 depicts an embodiment in which the Hub 540 has a number of peripheral ports 559a-559f. It is possible that all of the peripheral ports 559a-559f are the same type of port (e.g., USB), but that is not required. A number of different types of peripheral electronic devices 1220, 1222, 1224, 1224, 1226, 1228, 1230 are attached to the Hub 540. Examples of peripheral electronic devices include, but are not limited to, a LIDAR sensor, a rangefinder, an IR camera, and an EO camera. The peripheral electronic devices may have different voltage level requirements (e.g., for power) and may use different communication protocols than each other. Each peripheral electronic device is connected to one of the peripheral ports 559 by a cable 1240. In one embodiment, each cable 1240 contains a converter (see converter 1110 in FIG. 11) in which case the cable may be referred to as a converter cable. In one embodiment, each cable 1240 has a non-volatile memory (e.g., EEPROM) that stores device communication protocol and power (e.g., voltage) requirements. Each cable 1240 may have a first connector to connect to a corresponding port on a peripheral device and second connector to connect to a corresponding port (e.g., Hub port 559) on Hub 540.

In an embodiment, cable 1240a converts between UART and the Hub port 559a. In an embodiment, cable 1240b converts between SPI and the Hub port 559b. In an embodiment, cable 1240c converts between I2C and the Hub port 559c. In an embodiment, cable 1240e converts between Ethernet and the Hub port 559e. In an embodiment, cable 1240f converts between CAN and the Hub port 559f.

The Hub 540 has a comm link converter 563, controller 1250 and voltage converter 561. The comm link converter 563 has data pathways connected to each Hub port 559 and to the data connection 557 to UAV. The comm link converter 563 may serve as a Data Hub between the UAV 201 and the peripheral electronic devices. The comm link converter 563 therefore mediates communication between the UAV 201 and the peripheral electronic devices. This mediation may include using a first communication protocol to communicate with, for example, the flight controller in the UAV 201 and a using a second communication protocol to communicate with a peripheral electronic device. Note that the peripheral electronic devices may use different communication protocols from each other.

The voltage converter 561 is connected to the power connector 555 to receive power from the UAV 201. The voltage converter 561 is connected to each Hub port 559 to provide a suitable voltage level to the Hub port 559. The voltage converter 561 may step down the voltage received from the UAV 201. In one embodiment, the voltage converter 561 has a battery eliminator circuit (BEC) that may be used to step down the voltage from the UAV. For example, the UAV may provide 24V DC, which could be stepped down to any fraction of 24V DC. However, stepping up the voltage from the UAV 201 is also possible with, for example, a charge pump.

The controller 1250 oversees operation of the Hub 540. In an embodiment, the controller 1250 reads non-volatile memory in the cables 1240 to learn what supply voltage and/or communication protocol should be used for the peripheral electronic device connected to the Hub 540. The controller 1250 instructs the voltage converter 561 what voltage level should be provided to each Hub port 559. The controller 1250 may also interface with the comm link converter 563 to facilitate communication between the UAV 201 and the peripheral electronic devices.

In one embodiment, the components on the hub 540 reside on a PCBA. The hub 540 and cables 1240 are one example of a hub system. The combination one or more of the controller 1250 and/or the comm link converter 563 may be referred to as one or more control circuits. The comm link converter 563 may be implemented in software, hardware, or a combination of software and hardware. The controller 1250 may be implemented in software, hardware, or a combination of software and hardware. The voltage converter 561 may include a battery eliminator circuit (BEC). In one embodiment, the voltage converter 561 include one or more charge pumps. In one embodiment, the voltage converter 561 includes one or more voltage regulators.

Figure 13:
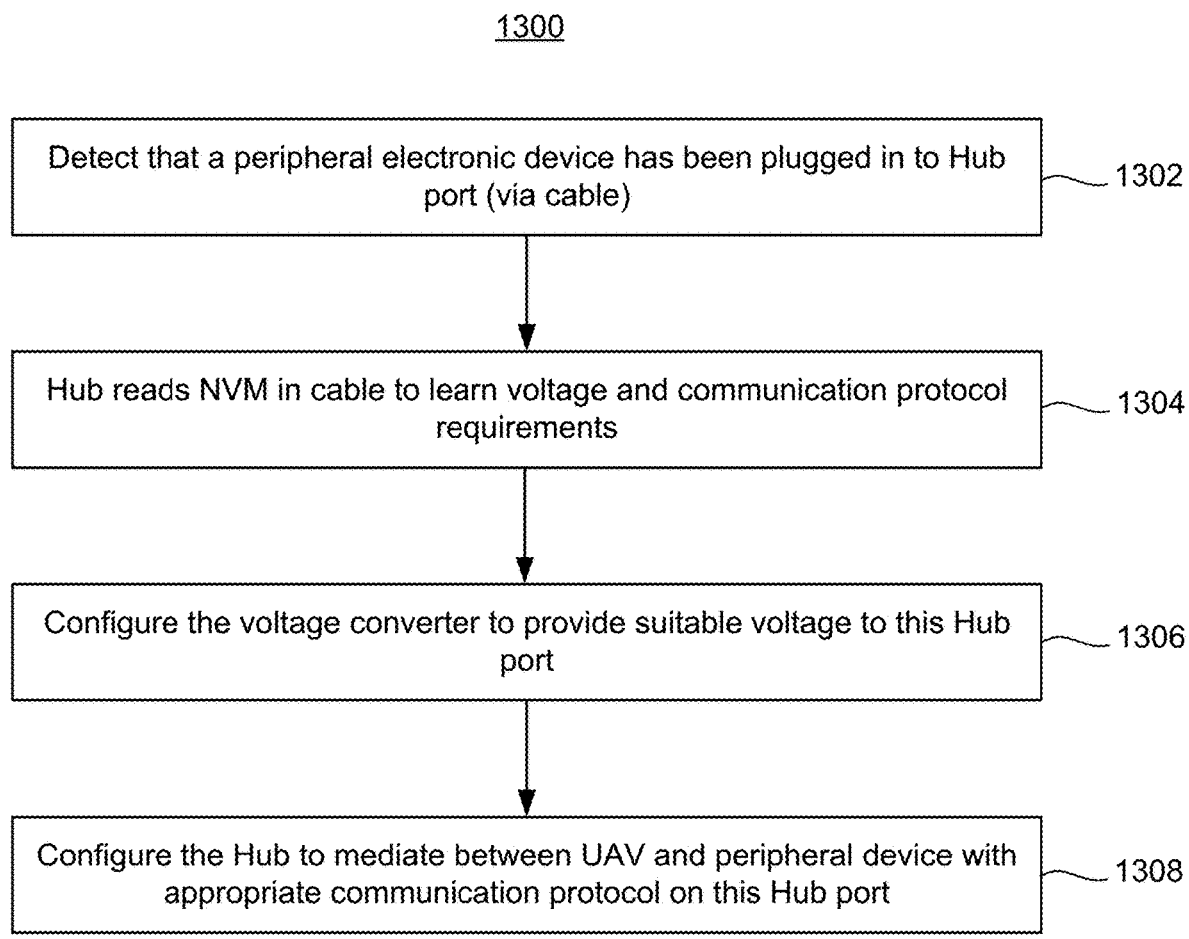
FIG. 13 is a flowchart of one embodiment of a process of configuring a plug-and-play Hub.

FIG. 13 is a flowchart of one embodiment of a process 1300 of configuration a plug-and-play hub 540. Step 1302 includes the Hub 540 detecting that a peripheral electronic device has been plugged into one of the Hub ports 559. More specifically, a cable 1040 that is attached to a peripheral electronic device is plugged in to one of the Hub ports 559. Step 1304 includes the Hub 540 reading configuration information from NVM 1112 in the cable 1040. Thus, the Hub 540 learns the voltage level needed by the peripheral electronic device and/or a communication protocol needed for communication with the peripheral electronic device. Step 1306 includes configuring the voltage converter 561 in the hub 540 to provide a voltage of a suitable magnitude to the Hub port 559. This voltage may be provided to a specific line in the Hub port 559 in order to provide the peripheral electronic device with a power supply voltage. Step 1308 includes configuring the hub 540 to communicate using the appropriate communication protocol on the Hub port 559. Therefore, the hub 540 is configured to mediate data communication between the UAV 201 and the peripheral electronic device.

Figure 14:
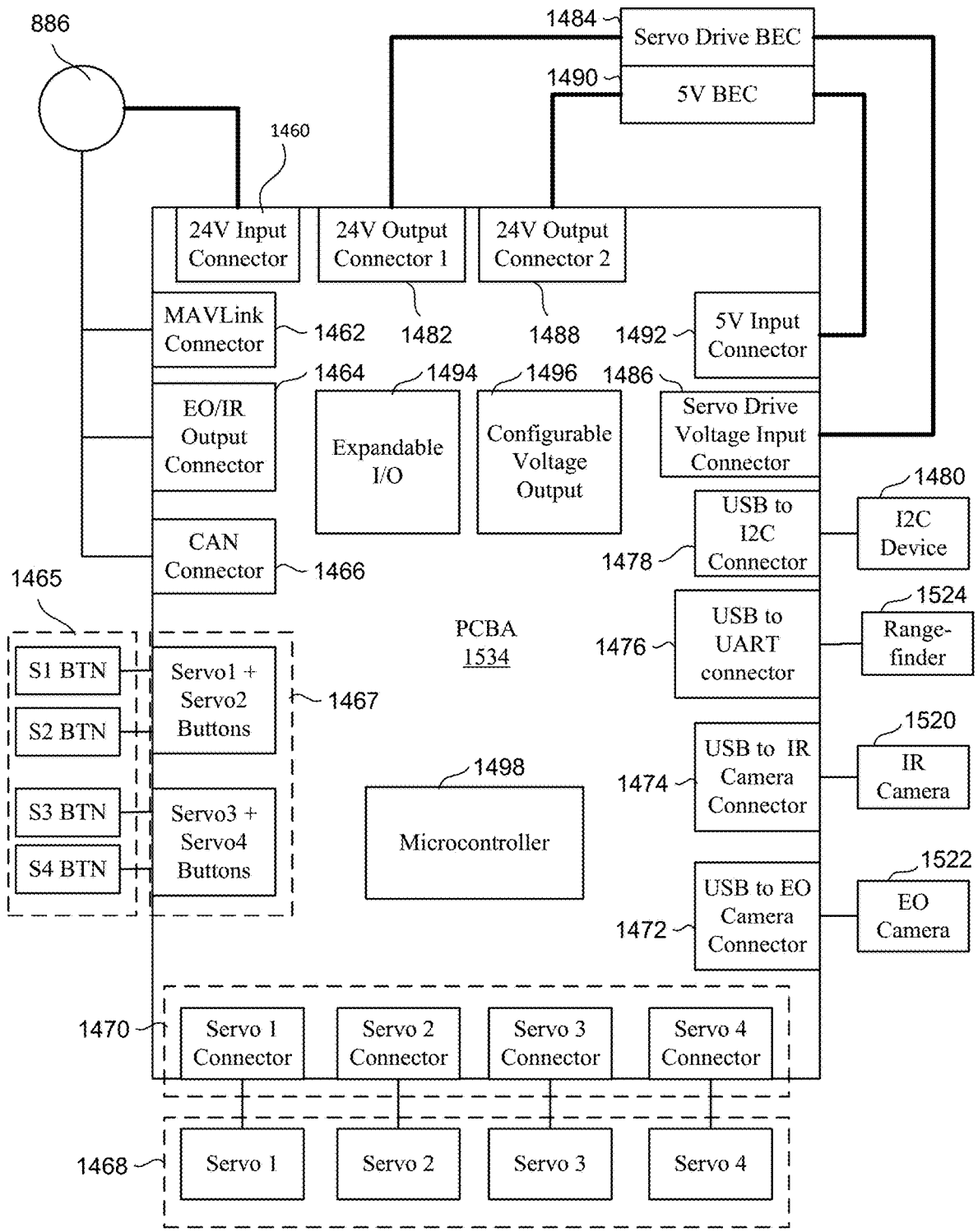
FIG. 14 illustrates an example of components of an electronic system of an MRD having one embodiment of a plug-and-play Hub.

In some embodiments the hub 540 is integrated into the same PCBA that contains the electronic system 996 of MRD 550. FIG. 14 shows an example implementation of hub 540, electronic system 996 of MRD 550 including PCBA 1534 and other electronic components. Connector 886 provides a 24-volt electrical supply (from a UAV) to 24V Input connector 1460 and also provides communication via MAVLink Connector 1462 (while MAVLink is the communication protocol used in this example, the present technology is not limited to any particular protocol). This may allow commands to be sent from a remote control, through a UAV (e.g., through wireless receiver 215), to PCBA 1534. Connector 886 is also connected to EO/IR Output Connector 1464, which provides output from a visible (EO) camera and/or infrared (IR) camera via connector 886 (e.g., via the UAV to a remote control). Connector 886 is also connected to a Controller Area Network (CAN) Connector 1466, which may enable communication with additional components. The MRD can support a wide range of input voltage (e.g., up to 50.4V).

Four buttons 1465 (S1 BTN to S4 BTN) are connected to corresponding switches 1467 on PCBA 1534, corresponding to four servo motors 1468 (Servo 1 to Servo 4) operating up to four payload latch mechanisms. Servo motors 1468 are connected by four connectors 1470 on PCBA 1534. The number of payload latch mechanisms and servos may depend on the desired payload/peripheral device(s) and the number of buttons may equal the number of servos so that they can be individually operated. In some cases, one button may operate more than one servo (e.g., where servos and latches are only operated together). Servos may be activated in response to commands individually, or otherwise (e.g., two or more servos activated in parallel).

Rangefinder 1524 is connected to PCBA 1534 by USB to UART connector 1476 (e.g., using a Universal Asynchronous Receiver-Transmitter or UART interface). A USB to I2C Connector 1478 is provided for communication with one or more (optional) devices using the I2C protocol (FIG. 14 shows I2C Device 1480). The USB to EO Camera Connector 1472 allows the EO camera 1522 to be connected to PCBA 1534. The USB to EO Camera Connector 1472 provides a connection between USB on the PCBA and the specific type of connection used by IR camera. The IR Camera 1520 is connected to PCBA 1534 by USB to IR Camera Connector 1474. The IR Camera Connector 1474 allows the IR Camera 1520 to be connected to PCBA 1534. Details have been described in connection with FIG. 10 of a hub 540 having USB ports 1010 that connector to various peripheral devices. FIG. 14 shows additional details of one example.

One or more power circuits may be provided in PCBA 1534 or elsewhere to operate servos and/or other components. FIG. 14 shows 24V Output Connector 1 1482 connected to Servo Drive BEC (Battery Eliminator Circuit) 1484, which provides an electrical supply to Servo Drive Voltage Input Connector 1486. Output Connector 2 1488 is connected to 5V BEC 1490, which provides a 5 volt electrical supply to 5V Input Connector 1492. Servo Drive BEC 1484 and 5V BEC 1490 may be implemented by voltage regulators that convert the 24 volt supply to appropriate voltages. The MRD can support a wide range of input voltage and the Servo Drive BEC is adjustable to meet voltage requirements of a wide range of electric motors. Moreover, the BECs allow for a wide range of voltages to be provided to the interfaces 1472, 1474, 1476, and 1478 to serve the needs of a wide range of peripheral electronic devices, An expandable Input/output circuit, "Expandable I/O" 1494 is provided to allow additional components to be connected to electronic system 996. For example, additional sensors or other electronic components (e.g., cameras, rangefinders, lidar, Global Positioning System (GPS) and/or lights) may be connected to expandable I/O 1494. A Configurable Voltage Output circuit 1496 is configurable to provide power for such electronic components at configurable voltage(s). This allows a wide range of additional components to be integrated with MRD 550 according to desired configuration (e.g., according to payload(s) and/or environmental or other conditions).

In an example, Expandable I/O 1494, Configurable Voltage Output voltage circuit 1496 and/or other circuits may be connected to one or more payload/peripheral device components. In some cases, a payload/peripheral device may receive power from MRD 550 and/or be in communication with MRD 550 via wired connections (and may be in communication with a UAV and/or remote control through MRD 550).

A controller (microcontroller 1498) is provided to control other components shown and to communicate with a UAV through connector 886 (e.g., via one or more of MAVLink Connector 1462, EO/IR Output Connector 1464 and/or CAN connector 1466) and via the UAV, communicate with a remote control (e.g., receiving commands from a remote control and sending video and other data to the remote control). Microcontroller 1498 is configured to control servo motors 1468 and thereby control payload latch mechanisms in response to commands. Servo motors may be activated individually or otherwise according to a received command. For example, microcontroller 1498 may be configured to actuate Servo 1 and not Servo 2 in response to a first command, actuate the Servo 2 and not Servo 1 in response to a second command, and actuate both Servo 1 and Servo 2 simultaneously in response to a third command.

Microcontroller 1498 may include programmable logic devices (PLDs) and/or software/firmware configurable circuits to perform different operations. In some cases, microcontroller 1498 may be configured to process data (e.g., from sensors including cameras 1520 and 1522 and rangefinder 1524) and perform operations according to determinations made from processing the data. For example, microcontroller 1498 may determine that it is at a drop location based on visual imagery and/or other data (e.g., GPS data) and may automatically drop a payload/peripheral device in response (e.g., without a command from a remote control). Microcontroller 1498 may be configured to recognize a payload/peripheral device (e.g., to recognize a frame of a drop-plate as discussed further below) and to align with lugs of the payload/peripheral device using visual imagery and/or other data for pickup of a payload/peripheral device. The onboard microcontroller is capable of converting data from additional sensors, which may use different communication protocols) and sending that data to the UAV via communication protocol in use by the MRD and UAV. This capability allows for the addition of sensors to the UAV without the need for additional electrical connections. Microcontroller 1498 may be configured (e.g., by software, hardware, or a combination) to convert external sensor data to a protocol used between microcontroller 1498 and the UAV and send it to the UAV without adding another communication channel or reconfiguring the existing communication circuit or protocol.

In view of the foregoing, one embodiment includes a hub for an Unmanned Aerial Vehicle (UAV). The hub comprises a plurality of peripheral ports. Each peripheral port is configured to allow connection of a peripheral electronic device. Each peripheral port has a power line configured to provide power to a peripheral electronic device and a physical pathway for data transfer to and from the peripheral electronic device. The hub comprises a UAV interface configured to connect to the UAV to receive power from the UAV and to provide a physical pathway for data transfer to and from the UAV. The hub comprises a voltage converter connected to the UAV interface to receive the power from the UAV. The voltage converter is connected to the plurality of peripheral ports to provide a suitable voltage to the power line of the respective peripheral ports based on a peripheral electronic device connected to the respective peripheral port. The voltage converter is configured to convert the voltage from the UAV to at least one other voltage level. The hub comprises one or more control circuits coupled to the plurality of peripheral ports, to the UAV interface, and to the voltage converter. The one or more control circuits are configured to detect that a peripheral electronic device has been plugged into a first peripheral port of the peripheral ports. The one or more control circuits are configured to access communication protocol information and voltage level information by way of the first peripheral port. The communication protocol information specifies a communication protocol used by the peripheral electronic device connected to the first peripheral port and the voltage level information specifies a level of a supply voltage for the peripheral electronic device. The one or more control circuits are configured to instruct the voltage converter to provide a voltage to the power line of the first peripheral port in accordance with the voltage level information. The one or more control circuits are configured to mediate data communication between the peripheral electronic device and the UAV.

In a further embodiment, mediating data communication between the peripheral electronic device and the UAV includes using a first communication protocol to communicate with the UAV and a second communication protocol to communicate with the peripheral electronic device connected to the first peripheral port. The second communication protocol is specified in the communication protocol information.

In a further embodiment, the one or more control circuits are configured to, for each respective peripheral port, read non-volatile memory in a cable attached to the respective peripheral port to access the communication protocol information and the voltage level information.

In a further embodiment, the non-volatile memory in the cable comprises an EEPROM.

In a further embodiment, the one or more control circuits instruct the voltage converter to provide a supply voltage to the first peripheral port in accordance with the voltage level information. The voltage converter comprises a battery eliminator circuit (BEC) configured to step down a voltage of the power provided by the UAV over the UAV interface to the supply voltage in accordance with the voltage level information.

In a further embodiment, the peripheral electronic device is one of: a UART (Universal Asynchronous Receiver-Transmitter) device, an SPI (Serial Peripheral port) device, an I2C (Inter-Integrated Circuit) device, an Ethernet device, or a CAN (Controller Area Network) device. The one or more control circuits are configured to communicate over the peripheral ports with a UART device, an SPI device, an I2C device, an Ethernet device, and a CAN device.

In a further embodiment, the UAV interface comprises a MAVLink. The one more or control circuits are configured to communicate with the UAV using a MAVLink communication protocol.

In a further embodiment, the UAV interface comprises an Ethernet link. The one more or control circuits are configured to communicate with the UAV using an Ethernet communication protocol.

In a further embodiment, the plurality of peripheral ports are each a USB port.

In a further embodiment, the plurality of peripheral ports, the UAV interface, the voltage converter, and the one or more control circuits each reside on a printed circuit board assembly (PCBA).

An embodiment includes a method for configuring a hub for an Unmanned Aerial Vehicle (UAV). The method comprises detecting a peripheral electronic device has been plugged into a peripheral port of the hub. The method comprises accessing, by a controller in the hub, communication protocol information and voltage level information in response to the peripheral electronic device being plugged in to the peripheral port, wherein the communication protocol information specifies a communication protocol used by the peripheral electronic device. The method comprises receiving a power source voltage from the UAV by way of a power interface between the hub and the UAV. The method comprises stepping down the power source voltage to a voltage level for the peripheral electronic device specified by the voltage level information. The method comprises providing the stepped down voltage through the peripheral port to the peripheral electronic device. The method comprises controlling data communication between the peripheral electronic device and the UAV with a first communication protocol used by the peripheral electronic device and a second communication protocol used by the UAV, wherein the first communication protocol is specified in the communication protocol information.

An embodiment includes a plug-and-play hub system for an Unmanned Aerial Vehicle (UAV). The plug-and-play hub system comprises a plurality of cables. The plurality of cables including converter cables having non-volatile memory having stored therein configuration information for a peripheral electronic device. The plug-and-play hub system comprises a printed circuit board assembly (PCBA) comprising a plurality of peripheral ports, each peripheral port configured to allow connection of one of the plurality of cables. The PCBA comprises a UAV interface configured to connect to the UAV to receive power from the UAV and to transfer data between the UAV and the UAV interface. The PCBA comprises a voltage converter connected to the UAV interface to receive power from the UAV. The voltage converter is connected to the plurality of peripheral ports to provide a peripheral supply voltage to the respective peripheral ports. The voltage converter configured to convert the voltage from the UAV to at least one other voltage level. The PCBA comprises a microcontroller coupled to the plurality of peripheral ports, to the UAV interface, and to the voltage converter. The microcontroller is configured to detect that a cable has been plugged into a first peripheral port of the peripheral ports. The microcontroller is configured to read the configuration information from the non-volatile memory in the plugged in cable. The microcontroller is configured to instruct the voltage converter to provide a peripheral supply voltage to the plugged in cable in accordance with a voltage specified in the configuration information. The microcontroller is configured to mediate data communication between a peripheral electronic device connected to the cable and the UAV, including using a first communication protocol to communicate with the UAV and a second communication protocol to communicate over the cable with the peripheral electronic device connected to the first peripheral port, wherein the second communication protocol is described in the configuration information.

For purposes of this document, it should be noted that while various examples are given with specific combinations of components and specific configurations, in general, components used in one example may also be used in other examples and configurations may be combined.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

The invention claimed is:

1. A hub for an Unmanned Aerial Vehicle (UAV), the hub comprising:
   a plurality of peripheral ports, each peripheral port configured to allow connection of a peripheral electronic device, each peripheral port having a power line configured to provide power to a peripheral electronic device and a physical pathway for data transfer to and from the peripheral electronic device;
   a UAV interface configured to connect to the UAV to receive power from the UAV and to provide a physical pathway for data transfer to and from the UAV;
   a voltage converter connected to the UAV interface to receive the power from the UAV, the voltage converter connected to the plurality of peripheral ports to provide a suitable voltage to the power line of the respective peripheral ports based on a peripheral electronic device connected to the respective peripheral port, the voltage converter configured to convert the voltage from the UAV to at least one other voltage level; and
   one or more control circuits coupled to the plurality of peripheral ports, to the UAV interface, and to the voltage converter, wherein the one or more control circuits are configured to:
      detect that a peripheral electronic device has been plugged into a first peripheral port of the peripheral ports;
      access communication protocol information and voltage level information by way of the first peripheral port, wherein the communication protocol information specifies a communication protocol used by the peripheral electronic device connected to the first peripheral port and the voltage level information specifies a level of a supply voltage for the peripheral electronic device;
      instruct the voltage converter to provide a voltage to the power line of the first peripheral port in accordance with the voltage level information; and
      mediate data communication between the peripheral electronic device and the UAV.

2. The hub of claim 1, wherein mediating data communication between the peripheral electronic device and the UAV includes:
   using a first communication protocol to communicate with the UAV and a second communication protocol to communicate with the peripheral electronic device connected to the first peripheral port, wherein the second communication protocol is specified in the communication protocol information.

3. The hub of claim 1, wherein the one or more control circuits are configured to, for each respective peripheral port, read non-volatile memory in a cable attached to the respective peripheral port to access the communication protocol information and the voltage level information.

4. The hub of claim 3, wherein the non-volatile memory comprises an EEPROM.

5. The hub of claim 1, wherein:
the one or more control circuits instruct the voltage converter to provide a supply voltage to the first peripheral port in accordance with the voltage level information; and
the voltage converter comprises a battery eliminator circuit (BEC) configured to step down a voltage of the power provided by the UAV over the UAV interface to the supply voltage in accordance with the voltage level information.

6. The hub of claim 1, wherein the peripheral electronic device is one of:
a UART (Universal Asynchronous Receiver-Transmitter) device, an SPI (Serial Peripheral port) device, an I2C (Inter-Integrated Circuit) device, an Ethernet device, or a CAN (Controller Area Network) device; and
the one or more control circuits are configured to communicate over the peripheral ports with a UART device, an SPI device, an I2C device, an Ethernet device, and a CAN device.

7. The hub of claim 6, wherein:
the UAV interface comprises a MAVLink; and
the one more or control circuits are configured to communicate with the UAV using a MAVLink communication protocol.

8. The hub of claim 6, wherein:
the UAV interface comprises an Ethernet link; and
the one more or control circuits are configured to communicate with the UAV using an Ethernet communication protocol.

9. The hub of claim 6, wherein the plurality of peripheral ports are each a USB port.

10. The hub of claim 1, wherein the plurality of peripheral ports, the UAV interface, the voltage converter, and the one or more control circuits each reside on a printed circuit board assembly (PCBA).

11. A method for configuring a hub for an Unmanned Aerial Vehicle (UAV), the method comprising:
detecting a peripheral electronic device has been plugged into a peripheral port of the hub;
accessing, by a controller in the hub, communication protocol information and voltage level information in response to the peripheral electronic device being plugged in to the peripheral port, wherein the communication protocol information specifies a communication protocol used by the peripheral electronic device;
receiving a power source voltage from the UAV by way of a power interface between the hub and the UAV;
stepping down the power source voltage to a voltage level for the peripheral electronic device specified by the voltage level information;
providing the stepped down voltage through the peripheral port to the peripheral electronic device; and
controlling data communication between the peripheral electronic device and the UAV with a first communication protocol used by the peripheral electronic device and a second communication protocol used by the UAV, wherein the first communication protocol is specified in the communication protocol information.

12. The method of claim 11, wherein accessing, by the controller in the hub, the communication protocol information and the voltage level information in response to the peripheral electronic device being plugged in to the peripheral port comprises:
reading non-volatile memory in a cable connected between the peripheral port and a port of the peripheral electronic device.

13. The method of claim 11, wherein accessing, by the controller in the hub, the communication protocol information and the voltage level information in response to the peripheral electronic device being plugged in to the peripheral port comprises:
reading an EEPROM in a cable connected between the peripheral port and a port of the peripheral electronic device.

14. A plug-and-play hub system for an Unmanned Aerial Vehicle (UAV), the plug-and-play hub system comprising:
a plurality of cables, the plurality of cables including converter cables having non-volatile memory having stored therein configuration information for a peripheral electronic device; and
a printed circuit board assembly (PCBA) comprising:
a plurality of peripheral ports, each peripheral port configured to allow connection of one of the plurality of cables;
a UAV interface configured to connect to the UAV to receive power from the UAV and to transfer data between the UAV and the UAV interface;
a voltage converter connected to the UAV interface to receive power from the UAV, the voltage converter connected to the plurality of peripheral ports to provide a peripheral supply voltage to respective peripheral ports, the voltage converter configured to convert the voltage from the UAV to at least one other voltage level; and
a microcontroller coupled to the plurality of peripheral ports, to the UAV interface, and to the voltage converter, wherein the microcontroller is configured to:
detect that a cable has been plugged into a first peripheral port of the peripheral ports;
read the configuration information from the non-volatile memory in the plugged in cable;
instruct the voltage converter to provide a peripheral supply voltage to the plugged in cable in accordance with a voltage specified in the configuration information; and
mediate data communication between a peripheral electronic device connected to the cable and the UAV, including using a first communication protocol to communicate with the UAV and a second communication protocol to communicate over the cable with the peripheral electronic device connected to the first peripheral port, wherein the second communication protocol is described in the configuration information.

15. The plug-and-play hub system of claim 14, wherein the converter cables each comprise:
a first connector having a first form factor configured to connect into a port of a peripheral electronic device; and
a second connector having a second form factor configured to connect to the peripheral ports.

16. The plug-and-play hub system of claim 15, wherein each converter cable has a converter circuit for converting data transfer between the port of the peripheral electronic device and the corresponding peripheral port.

17. The plug-and-play hub system of claim 15, wherein each converter cable has a conversion circuit configured to convert between a USB connector on a first end of the converter cable and another type of connector on a second end of the converter cable.

18. The plug-and-play hub system of claim 14, wherein the voltage converter comprises a battery eliminator circuit (BEC) configured to step down a voltage provided by the UAV over the UAV interface.

19. The plug-and-play hub system of claim 14, wherein:
the UAV interface comprises an Ethernet connection; and
the plurality of peripheral ports are USB ports.

20. The plug-and-play hub system of claim 14, wherein:
the UAV interface comprises a MAVLink connection; and
the plurality of peripheral ports are USB ports.

* * * * *